(12) United States Patent
Deishi et al.

(10) Patent No.: US 8,235,855 B2
(45) Date of Patent: Aug. 7, 2012

(54) HYDRAULIC CONTROL APPARATUS FOR AUTOMATIC TRANSMISSION

(75) Inventors: Teruyuki Deishi, Wako (JP); Shunji Kamo, Wako (JP); Shinya Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/840,296

(22) Filed: Jul. 21, 2010

(65) Prior Publication Data

US 2011/0028273 A1 Feb. 3, 2011

(30) Foreign Application Priority Data

Jul. 29, 2009 (JP) ................................ 2009-177129

(51) Int. Cl.
*F16H 31/00* (2006.01)

(52) U.S. Cl. ........................................ 475/123; 475/117

(58) Field of Classification Search .................. 475/117, 475/123

See application file for complete search history.

(56) References Cited

U.S. PATENT DOCUMENTS 4,939,502 A * 7/1990 Ito et al. ........................ 340/438
5,214,984 A * 6/1993 Sano .............................. 475/123
5,421,791 A * 6/1995 Futawatari ..................... 475/117

FOREIGN PATENT DOCUMENTS

JP 2005-321014 11/2005

* cited by examiner

*Primary Examiner* — Dirk Wright

(74) *Attorney, Agent, or Firm* — Ditthavong Mori & Steiner, P.C.

(57) ABSTRACT

A hydraulic control apparatus for an automatic transmission includes linear solenoid valves each configured to control a line pressure in accordance with an electromagnetic force of a solenoid. The linear solenoid valves each include a spool and are controlled under a normal hydraulic control mode or a current consumption decrease mode. The spool is actuated in accordance with the electromagnetic force. An output fluid pressure is controlled to be a maximum output fluid pressure from a minimum output fluid pressure with the spool at a balanced position under the normal hydraulic control mode. A current consumption for generating the electromagnetic force is decreased to make the fluid pressure equal to or lower than the minimum output fluid pressure under the normal hydraulic control mode and to hold the fluid pressure within a range corresponding to the balanced position under the current consumption decrease mode.

12 Claims, 13 Drawing Sheets

FIG. 6

| POSITION | SIGNAL LIST | | ON/OFF SOLENOID VALVE | | LINEAR SOLENOID VALVE | | | |
|---|---|---|---|---|---|---|---|---|
| | MODE | | FIRST | SECOND | FIRST | SECOND | THIRD | FOURTH |
| D | FIRST SPEED IN-GEAR | | ○ | × | OFF | OFF | OFF | PRESSURE INCREASE |
| | STEADY AT FIRST SPEED | | ○ | ○ | OFF | OFF | OFF | OFF/ PRESSURE INCREASE/ PRESSURE DECREASE |
| | 1-2UP | | ○ | ○ | PRESSURE INCREASE | OFF | OFF | PRESSURE INCREASE/ PRESSURE DECREASE |
| | STEADY AT SECOND SPEED | | ○ | ○ | MAX | OFF | OFF | PRESSURE INCREASE/ PRESSURE DECREASE |
| | 2-3UP | | ○ | ○ | PRESSURE DECREASE | PRESSURE INCREASE | OFF | PRESSURE INCREASE/ PRESSURE DECREASE |
| | STEADY AT THIRD SPEED | | × | ○ | OFF | MAX | OFF | PRESSURE INCREASE/ PRESSURE DECREASE |
| | 3-2DOWN | | ○ | ○ | PRESSURE INCREASE | PRESSURE DECREASE | OFF | PRESSURE INCREASE/ PRESSURE DECREASE |

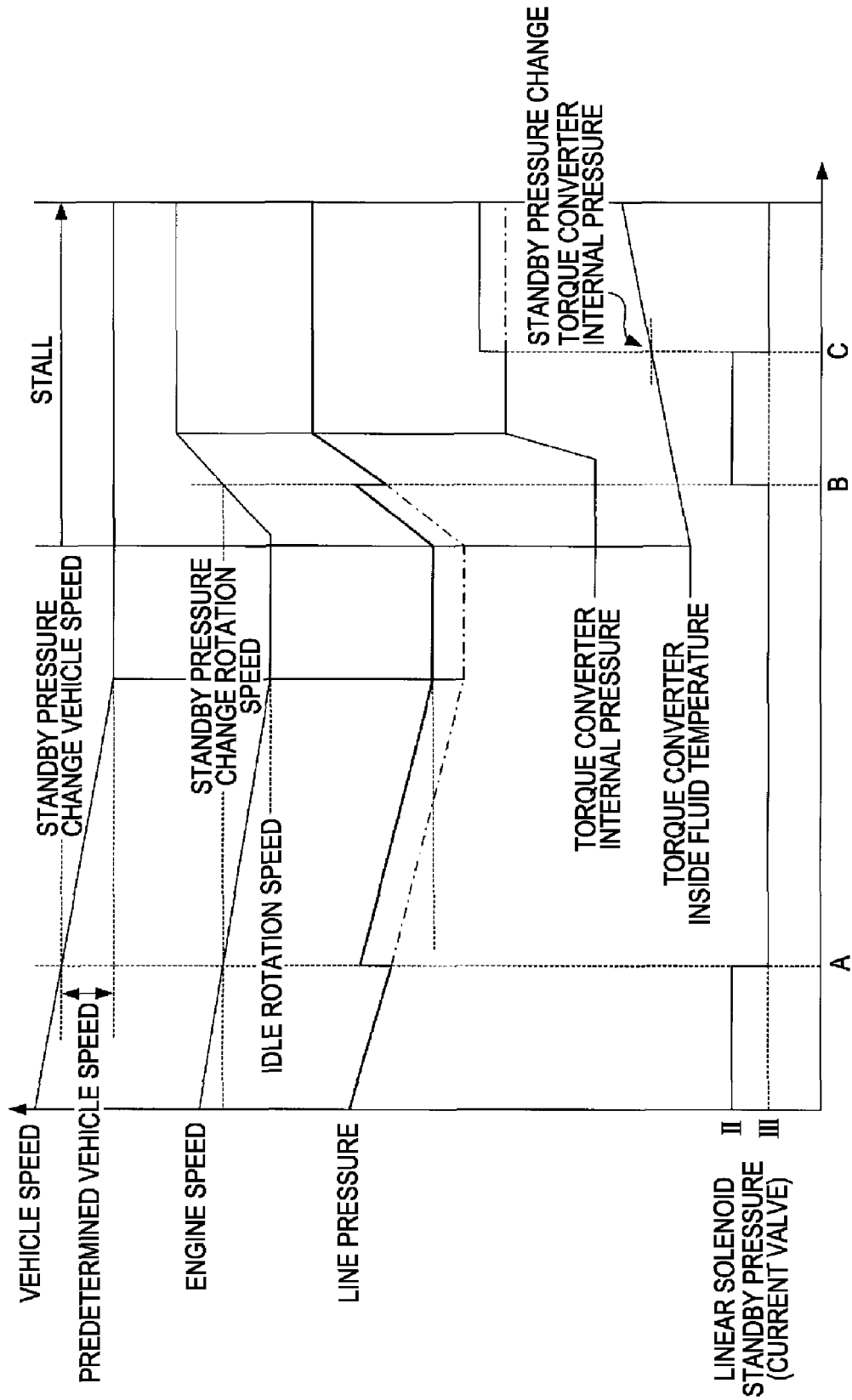

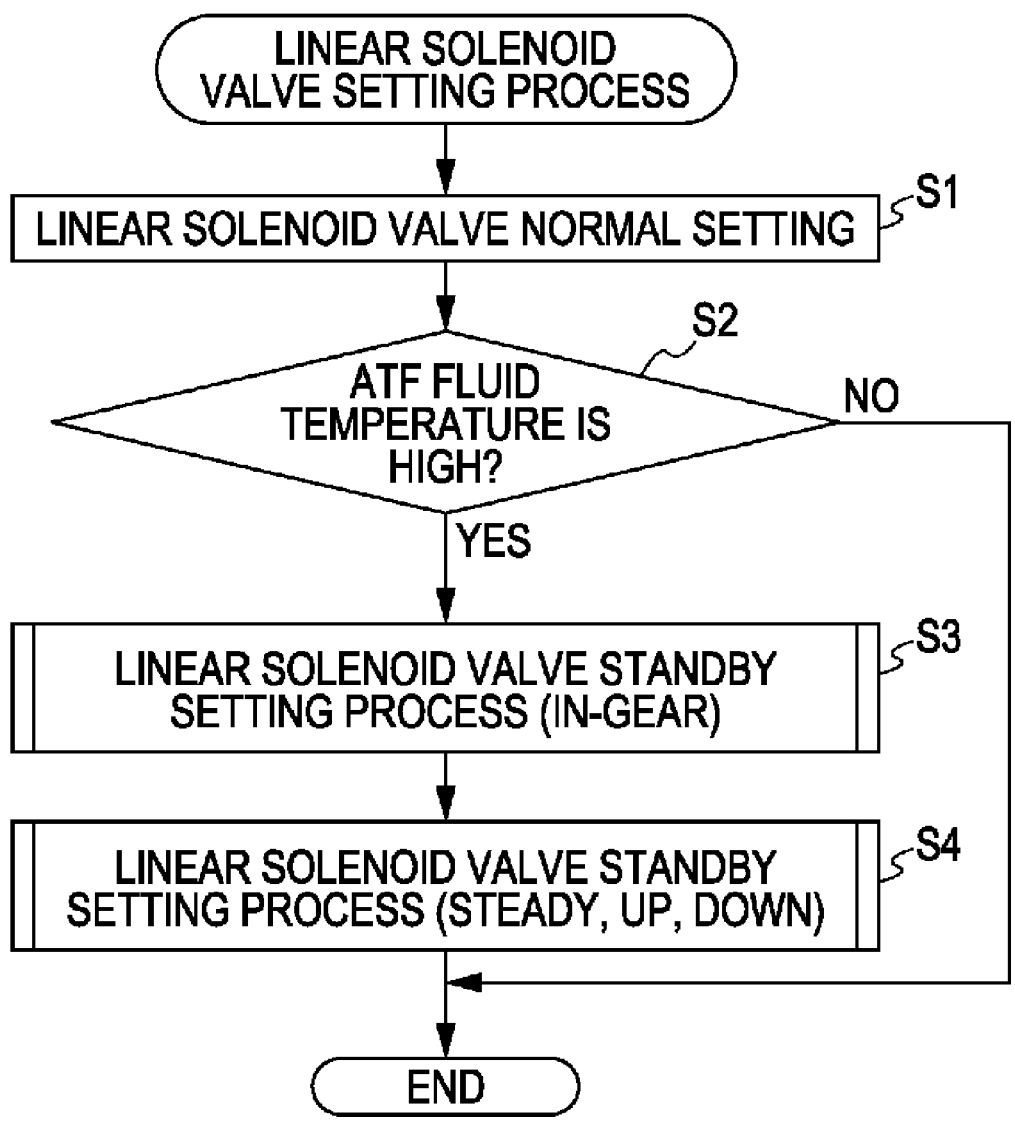

HYDRAULIC CONTROL APPARATUS FOR AUTOMATIC TRANSMISSION

CROSS REFERENCES TO RELATED APPLICATIONS

The present application claims priority under 35 U.S.C. §119 to Japanese Patent Application No. 2009-177129, filed Jul. 29, 2009, entitled "Hydraulic Control Device For Automatic Transmission." The contents of this application are incorporated herein by reference in their entirety.

BACKGROUND OF THE INVENTION

1. Field of the Invention

The present invention relates to a hydraulic control apparatus for an automatic transmission.

2. Discussion of the Background

A hydraulic control apparatus for an automatic transmission of related art that sets one of a plurality of speed stages with different gear ratios by selectively engaging and disengaging a plurality of hydraulic frictional engagement elements includes a plurality of linear solenoid valves to regulate fluid pressures of automatic transmission fluid that is supplied to the plurality of frictional engagement elements.

The hydraulic control apparatus for the automatic transmission uses one or more linear solenoid valves to set one of the speed stages (for example, a first speed (LOW gear)). However, the linear solenoid valves typically include a linear solenoid valve that is not used. For example, when a linear solenoid valve of a normally closed type is used, by setting an exciting current to zero, the consumption flow of the automatic transmission fluid by the unused linear solenoid valve can be decreased, and energy efficiency can be increased.

However, if the exciting current is set to zero, since a spool (a valve element) of the linear solenoid valve is held at a movement end at which the output of the fluid pressure is stopped, it takes a time until the spool is actually moved and balanced. The responsiveness of the fluid pressure may be degraded, and hence the responsiveness of the speed change may be degraded.

To address this, there is provided a hydraulic control apparatus for an automatic transmission, for example, disclosed in Japanese Unexamined Patent Application Publication No. 2005-321014 (hereinafter, referred to as the document '014). The hydraulic control apparatus uses the balance of a spool to change the state between a regulated state in which a fluid pressure corresponding to an electromagnetic force of a solenoid, and a not-regulated state in which the spool is held at a movement end at which the output of the fluid pressure is stopped. When the speed change of the automatic transmission is predicted or determined, the state of an unused linear solenoid valve, which regulates the fluid pressure of a hydraulic frictional engagement element to be newly engaged for the speed change, is changed to the regulated state before the speed change.

The hydraulic control apparatus for the automatic transmission disclosed in the document '014, the unused linear solenoid valve is in a minimally regulated state if an AT fluid temperature is a predetermined value or lower, and the unused linear solenoid valve is in a not-regulated state if the AT fluid temperature is higher than the predetermined value. With the control, the responsiveness of the fluid pressure is increased when the viscosity of the automatic transmission fluid is high, and the leaking flow is decreased when the viscosity of the automatic transmission fluid is low. Thus, the load on an engine can be decreased, and the fuel economy (fuel consumption efficiency) of a vehicle can be improved.

The hydraulic control apparatus for the automatic transmission disclosed in the document '014 controls the unused linear solenoid valve to be in the not-regulated state when the viscosity of the automatic transmission fluid is low or when the temperature of the automatic transmission fluid is high, however, the responsiveness may be degraded when the linear solenoid valve is used from the not-regulated state.

The hydraulic control apparatus for the automatic transmission disclosed in the document '014 controls the unused linear solenoid valve to be in the minimally regulated state when the viscosity of the automatic transmission fluid is high or when the temperature of the automatic transmission fluid is low, however, since the linear solenoid valve is in the minimally regulated state, a wall surface of an input port connected with a hydraulic pump contacts (or is located near) a wall surface of a spool groove. The automatic transmission fluid may flow out (leak). The hydraulic pump typically has a pump characteristic such that the discharge flow of the hydraulic pump changes depending on the engine speed. If the engine speed is low, the discharge flow of the hydraulic pump is low. Thus, if the consumption flow at the unused linear solenoid valve is high, the quantity of the automatic transmission fluid or lubricant may be smaller than the required quantity.

SUMMARY OF THE INVENTION

According to one aspect of the present invention, a hydraulic control apparatus for an automatic transmission includes a hydraulic pump, a regulator valve, a plurality of linear solenoid valves, a control state acquiring device, and a linear solenoid mode changing device. The hydraulic pump is driven by an engine. The regulator valve is configured to regulate a line pressure serving as a base pressure for actuating a plurality of frictional engagement elements by using a fluid pressure supplied from the hydraulic pump. The plurality of linear solenoid valves are each configured to control the line pressure regulated by the regulator valve in accordance with an electromagnetic force of a solenoid. Each of the linear solenoid valves includes a spool and is controlled under a normal hydraulic control mode and a current consumption decrease mode. The spool is actuated in accordance with the electromagnetic force of the solenoid. An output fluid pressure is controlled to be a maximum output fluid pressure from a minimum output fluid pressure with the spool which is at a balanced position under the normal hydraulic control mode. A current consumption for generating the electromagnetic force is decreased under the current consumption decrease mode so that the fluid pressure is controlled to be equal to or lower than the minimum output fluid pressure under the normal hydraulic control mode and the fluid pressure is held within a range corresponding to the balanced position of the spool. The frictional engagement elements are selectively engaged and disengaged by using fluid pressures supplied from the linear solenoid valves to establish a plurality of speed stages. The control state acquiring device is configured to acquire a control state of the automatic transmission. The linear solenoid mode changing device is configured to change an operating mode of the linear solenoid valves between the normal hydraulic control mode and the current consumption decrease mode based on the control state of the automatic transmission acquired by the control state acquiring device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates the relationship between typical speed modes in a D range and actuation states of first and second on/off solenoid valves and of first to fourth linear solenoid valves;

FIG. 7 is a timing chart illustrating the relationship between states of a vehicle when the vehicle is in a steady state at a first speed and applied currents of a linear solenoid valve;

FIG. 8 is a flowchart of a linear solenoid valve setting process executed by the AT-ECU in FIG. 2;

DESCRIPTION OF THE EMBODIMENTS

Hydraulic control apparatuses for automatic transmissions according to preferred embodiments of the invention will be described below with reference to the attached drawings.

Figure 1:
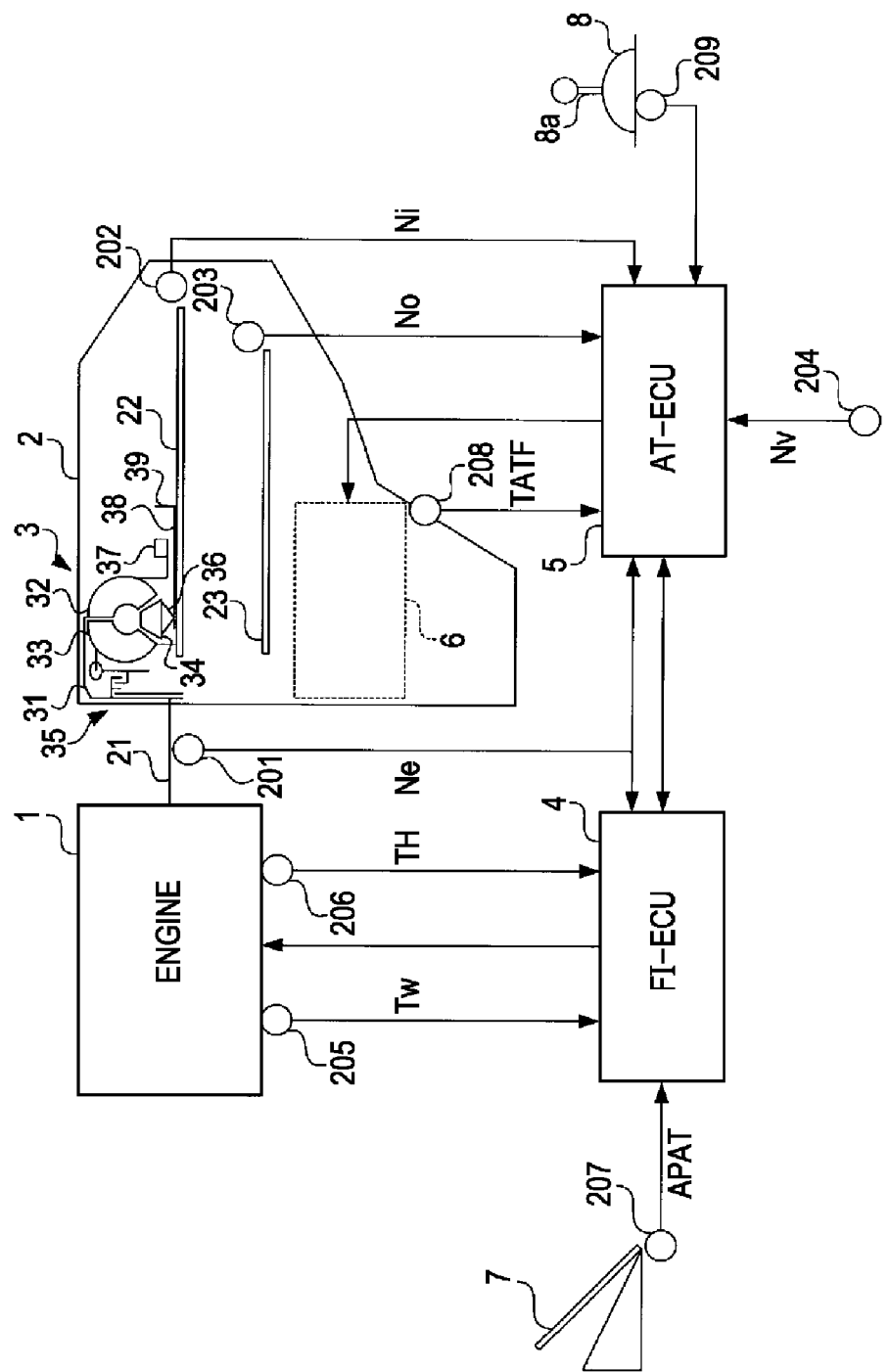
FIG. 1 schematically illustrates a driving system in a vehicle to which a hydraulic control apparatus for an automatic transmission according to an embodiment of the invention is applied.

A configuration of a vehicle to which a hydraulic control apparatus for an automatic transmission according to an embodiment of the invention is applied will be described. FIG. 1 schematically illustrates a driving system in a vehicle to which the hydraulic control apparatus for the automatic transmission according to the embodiment of the invention is applied. Referring to FIG. 1, the vehicle in this embodiment includes an engine 1, an automatic transmission 2 that is coupled with the engine 1 through a torque converter 3 of a fluid type, a fuel injection electronic control unit (hereinafter, referred to as FI-ECU) 4 that controls the engine 1, an automatic transmission electronic control unit (hereinafter, referred to as AT-ECU) 5 that controls the automatic transmission 2 including the torque converter 3, and a hydraulic control apparatus 6 that performs rotational driving and lockup control for the torque converter 3 and controls engagement and disengagement of a plurality of frictional engagement elements of the automatic transmission 2. A hydraulic control apparatus for an automatic transmission of the embodiment of the invention may include the hydraulic control apparatus 6 and the AT-ECU 5 that controls the hydraulic control apparatus 6.

The torque of the engine 1 is output to a crankshaft (an output shaft of the engine 1) 21. The rotation of the crankshaft 21 is transmitted to a main shaft 22 of the automatic transmission 2 through the torque converter 3.

The torque converter 3 transmits the torque through fluid (automatic transmission fluid). Referring to FIG. 1, the torque converter 3 includes a front cover 31, a pump impeller 32 integrally formed with the front cover 31, a turbine impeller (turbine runner) 33 arranged between the front cover 31 and the pump impeller 32 to face the pump impeller 32, and a stator impeller 34 arranged between the pump impeller 32 and the turbine impeller 33 and rotatably supported on a stator shaft (fixed shaft) 38 via a one-way clutch 36. Referring to FIG. 1, the crankshaft 21 is connected with the pump impeller 32 of the torque converter 3 through the front cover 31, and the turbine impeller 33 is connected with the main shaft (an input shaft of the automatic transmission 2) 21.

A lockup clutch 35 is provided between the turbine impeller 33 and the front cover 31. The lockup clutch 35 performs lockup control under the control of the hydraulic control apparatus 6 based on an instruction from the AT-ECU 5. In the lockup control, the lockup clutch 35 is engaged with the front cover 31 when the lockup clutch 35 is pressed toward the inner surface of the front cover 31, and disengaged from the front cover 31 when the pressure is released. The front cover 31 and the pump impeller 32 define a container. Automatic transmission fluid (ATF) is sealed in the container.

If the lockup control is not performed, relative rotation between the pump impeller 32 and the turbine impeller 33 is allowed. In this state, when the torque of the crankshaft 21 is transmitted to the pump impeller 32 through the front cover 31, the automatic transmission fluid filled in the container of the torque converter 3 circulates from the pump impeller 32 to the turbine impeller 33 and then to the stator impeller 34 by the rotation of the pump impeller 32. Accordingly, the torque of the pump impeller 32 is hydrodynamically transmitted to the turbine impeller 33, and the torque is amplified during the transmission. Thus, the main shaft 22 is driven. At this time, the stator impeller 34 bears a reaction force of the torque (hereinafter, referred to as "stator reaction force").

During the lockup control, the lockup clutch 35 is engaged. The rotation is not transmitted from the front cover 31 to the turbine impeller 33 by using the automatic transmission fluid, but the front cover 31 and the turbine impeller 33 are rotated together. The torque of the crankshaft 21 is directly transmitted to the main shaft 22.

Referring to FIG. 1, a pump driving gear 37 is provided at the right end of the pump impeller 32. The pump driving gear 37 drives a hydraulic pump OP shown in FIG. 5. A stator arm 39 is provided at the right end of the stator shaft 38. The stator arm 39 controls a main regulator valve 64 shown in FIG. 5 when the fluid pressure (a line pressure PL) is a high line pressure.

In this embodiment, the automatic transmission 2 is an automatic transmission for a vehicle having six forward speed stages and a single reverse speed stage. The automatic transmission 2 includes a plurality of gear trains and a plurality of clutches (frictional engagement elements) provided for respective gear stages. Each gear train includes a pair of a driving gear and a driven gear. The configuration of the automatic transmission 2 is not the feature part of the embodiment of the invention, and the detailed description with reference to a perspective drawing or the like will be omitted. A person skilled in the art may appropriately use the existing configuration of the automatic transmission. The clutches relating to the hydraulic control for the automatic transmission will be described later with reference to FIG. 5.

The torque of the main shaft 22 is transmitted to a countershaft 23 through clutches and gear trains, gear trains for a secondary shaft and an idle shaft, etc., although not shown in FIG. 1. The torque of the countershaft 23 is transmitted to driving wheels through gear trains and a differential mechanism although not shown in FIG. 1.

The hydraulic control apparatus 6 is provided in the automatic transmission 2 for the automatic transmission 2 and the torque converter 3. The hydraulic control apparatus 6 supplies the automatic transmission fluid at the line pressure PL (a fluid pressure) to a subject frictional engagement element (a clutch), so as to selectively engage and disengage (i.e., to perform engagement actuation for) the plurality of frictional engagement elements (clutches) (not shown) in the automatic transmission 2, and to set one of the plurality of speed stages. The control by the hydraulic control apparatus 6 when each of the speed stages is set will be described later with reference to a hydraulic circuit in FIG. 5.

The hydraulic control apparatus 6 supplies the automatic transmission fluid at the fluid pressure to the pump impeller 32 of the torque converter 3, so as to control a torque converter slip ratio ETR, which is indicative of the level of transmission of the rotational driving from the crankshaft 21 to the main shaft 22. Also, the hydraulic control apparatus 6 supplies the automatic transmission fluid at the fluid pressure to a fluid chamber (not shown) of the lockup clutch 35, so as to cause the lockup clutch 35 to be engaged under a predetermined condition such as when the vehicle cruises.

Further, the hydraulic control apparatus 6 supplies lubricant at a lubricant pressure to the main shaft 22, the countershaft 23, etc., so as to lubricate the main shaft 22, the countershaft 23, a secondary shaft (not shown), and an idle shaft (not shown). The secondary shaft and the idle shaft are provided depending on the number of speed stages and the shape of the automatic transmission 2.

A crankshaft rotation speed sensor 201 is provided near the crankshaft 21. The crankshaft rotation speed sensor 201 detects a rotation speed Ne of the crankshaft 21 (or the engine 1). A main shaft rotation speed sensor 202 is provided near the main shaft 22. The main shaft rotation speed sensor 202 detects a rotation speed Ni of the main shaft 22 (or an input shaft rotation speed of the automatic transmission 2). A countershaft rotation speed sensor 203 is provided near the countershaft 23. The countershaft rotation speed sensor 203 detects a rotation speed No of the countershaft 23 (or an output shaft rotation speed of the automatic transmission 2). The data of the rotation speeds detected by the rotation speed sensors 201 to 203 is output to the AT-ECU 5. The data of the rotation speed detected by the crankshaft rotation speed sensor 201 is also output to the FI-ECU 4.

A vehicle speed sensor 204 is provided at a predetermined position of the vehicle. The vehicle speed sensor 204 detects a vehicle speed Nv of the vehicle. The data of the vehicle speed detected by the vehicle speed sensor 204 is output to the AT-ECU 5. Alternatively, the vehicle speed sensor 204 that only detects the vehicle speed Nv may be omitted, and the vehicle speed Nv may be calculated by using the rotation speed Ni of the main shaft 22 or the rotation speed No of the countershaft 23. For example, the vehicle speed Nv may be detected (calculated) by a relational expression of "Nv=Ni* (gear ratio)*(tire perimeter)" or "Nv=No*(tire perimeter)."

A coolant temperature sensor 205 that detects an engine coolant temperature Tw of the coolant for cooling the engine 1, and a throttle opening sensor 206 that detects a throttle opening TH of the throttle (not shown) of the engine 1 are provided near the engine 1. The data of the coolant temperature detected by the coolant temperature sensor 205 and the data of the throttle opening detected by the throttle opening sensor 206 are output to the FI-ECU 4.

An accelerator pedal opening sensor 207 is provided near an accelerator pedal 7 and coupled with the accelerator pedal 7 by a wire or the like (not shown). The accelerator pedal opening sensor 207 detects an opening (an accelerator pedal opening) APAT of the accelerator pedal 7. The data of the accelerator pedal opening detected by the accelerator pedal opening sensor 207 is output to the FT-ECU 4.

Also, a fluid temperature sensor 208 is provided near a fluid tank, which is described later, in the hydraulic control apparatus 6. The fluid temperature sensor 208 detects a fluid (or lubricant) temperature TATF of the hydraulic control apparatus 6. The data of the fluid temperature (an oil temperature) detected by the fluid temperature sensor 208 is output to the AT-ECU 5.

Further, a shift lever position sensor 209 is provided near a shift operation device 8 including a shift lever 8a. The shift lever position sensor 209 detects a shift position of the shift lever 8a. A position signal of the shift lever 8a detected by the shift lever position sensor 209 is output to the AT-ECU 5. The shift lever 8a of the shift operation device 8 has positions including, as in related art, a parking position (P), a reverse travel position (R), a neutral position (N), a forward travel position under an automatic transmission mode (normal mode) (D), a forward travel position under a sport mode) (S), etc.

The FI-ECU 4 controls the output of the engine 1, that is, the rotation speed Ne of the engine 1 based on the detected data input from the sensors 201, and 205 to 207, and the data input from the AT-ECU 5. The AT-ECU 5 controls a valve group in the automatic transmission 2 (described later) based on the detected data input from the sensors 201 to 204, and 208, and the data input from the FI-ECU 4, so as to perform the engagement of one of the plurality of frictional engagement elements (clutches) and the engagement of the lockup clutch 35.

Figure 2:
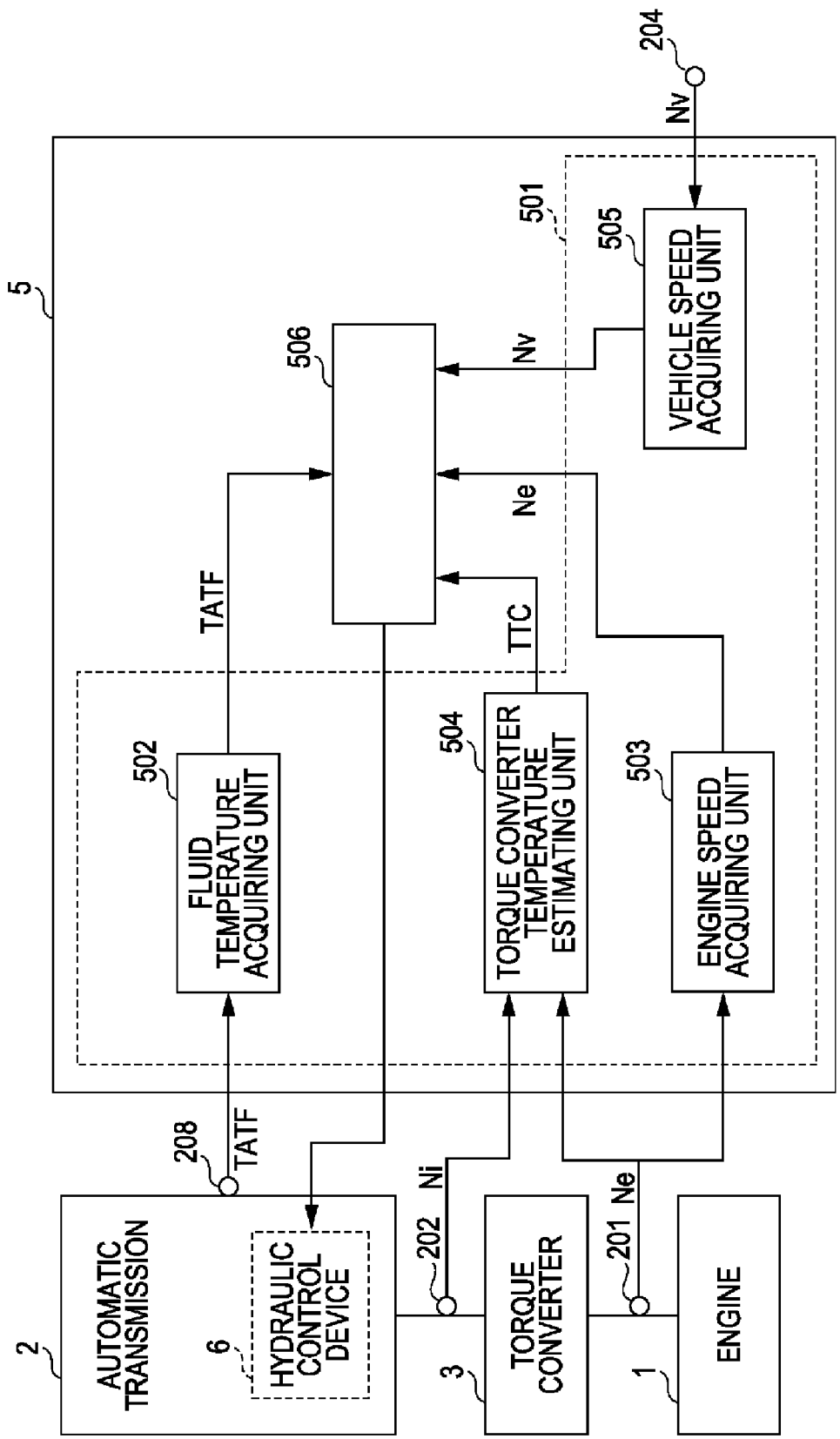
FIG. 2 is a functional block diagram of an AT-ECU in FIG. 1.

Next, the configuration (function) of the AT-ECU 5 according to this embodiment will be described below. FIG. 2 is a functional block diagram of the AT-ECU 5 in FIG. 1. Referring to FIG. 2, the AT-ECU 5 of this embodiment includes a control state acquiring device 501 that acquires a control state of the automatic transmission 2, and a linear solenoid mode changing device 506 that changes a mode between a normal hydraulic control mode and a current consumption decrease mode based on the control state of the automatic transmission 2 acquired by the control state acquiring device 501. The AT-ECU 5 has various functions that control the automatic transmission 2, in addition to the control state acquiring device 501 and the linear solenoid mode changing device 506. However, merely the feature functions of the embodiment of the invention will be described below.

The linear solenoid valves 41 to 44 (described later with reference to FIG. 5) actuate spools 41a to 44a in accordance with an electromagnetic force of a solenoid under the normal hydraulic control mode or the current consumption decrease mode. Under the normal hydraulic control mode, the spools 41a to 44a are at balanced positions and hence the fluid pressure is controlled to be a maximum output fluid pressure from a minimum output fluid pressure. Under the current consumption decrease mode, a current consumption for generating an electromagnetic force is decreased so that the fluid pressure is controlled to be equal to or lower than the minimum output fluid pressure under the normal hydraulic control mode and is held within a range corresponding to the balanced positions of the spools 41a to 44a.

In this embodiment, the control state acquiring device 501 includes a fluid temperature acquiring unit 502 that acquires the fluid temperature TATF of the automatic transmission fluid for the automatic transmission 2 detected by the fluid temperature sensor 208, an engine speed acquiring unit 503 that acquires the rotation speed Ne of the engine 1 detected by the crankshaft rotation speed sensor 201, a torque converter temperature estimating unit 504 that estimates a temperature (torque converter simulation temperature) TTC of the torque converter 3 based on a slip ratio ETR of the torque converter 3, and a vehicle speed acquiring unit 505 that acquires the vehicle speed Nv of the vehicle detected by the vehicle speed sensor 204.

In this embodiment, the slip ratio ETR of the torque converter 3 is calculated in the torque converter temperature estimating unit 504 based on the input shaft rotation speed (the rotation speed of the engine 1) Ne and the output shaft rotation speed (the input rotation speed of the automatic transmission 2) Ni of the torque converter 3. As the slip ratio ETR is higher (although the torque converter slip ratio ETR is one during the lockup control), slipping less frequently occurs in the torque converter 3, and hence the estimated temperature of the torque converter 3 becomes lower. In contrast, as the slip ratio ETR is lower, heat is generated due to the slipping in the torque converter 3, and hence the estimated temperature of the torque converter 3 becomes higher.

The linear solenoid mode changing device 506 changes the mode of an unused linear solenoid valve included in the linear solenoid valves 41 to 44, from the normal hydraulic control mode to the current consumption decrease mode in a linear solenoid valve setting process (described later), if the fluid temperature TATF of the automatic transmission fluid acquired by the fluid temperature acquiring unit 502 is a predetermined fluid temperature or higher, and if the rotation speed Ne of the engine 1 acquired by the engine speed acquiring unit 503 is a predetermined rotation speed or lower. As described above, since the linear solenoid mode changing device 506 changes the current value to be supplied to the subject unused linear solenoid valve included in the linear solenoid valves 41 to 44, a regulated state is attained in which the consumption flow at the linear solenoid valves 41 to 44 is minimized (hereinafter, referred to as "regulated low flow state"). Thus, a control fluid pressure can be prevented from being decreased.

Figure 3:
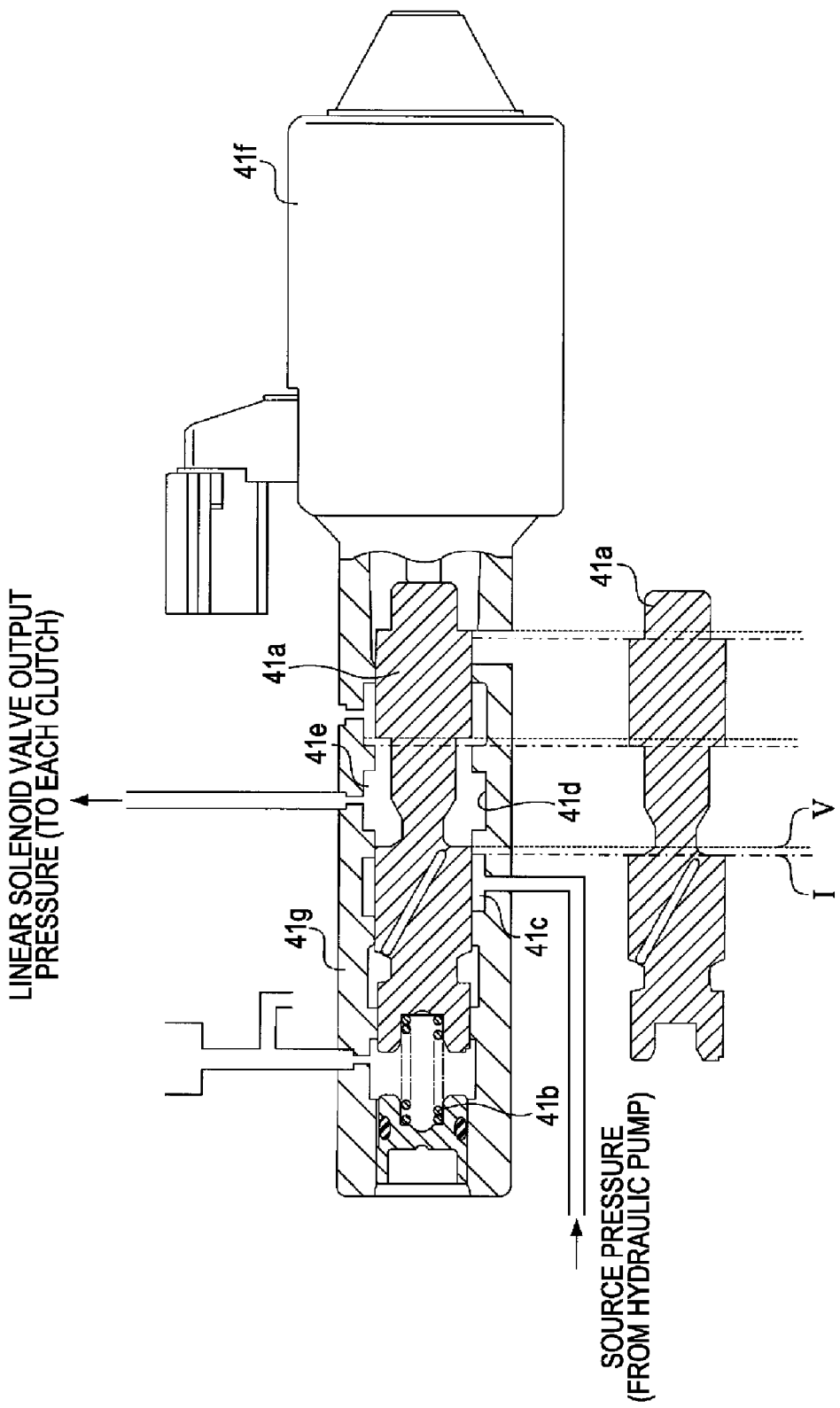
FIG. 3 is a partly sectioned view of a linear solenoid valve.
Figure 4:
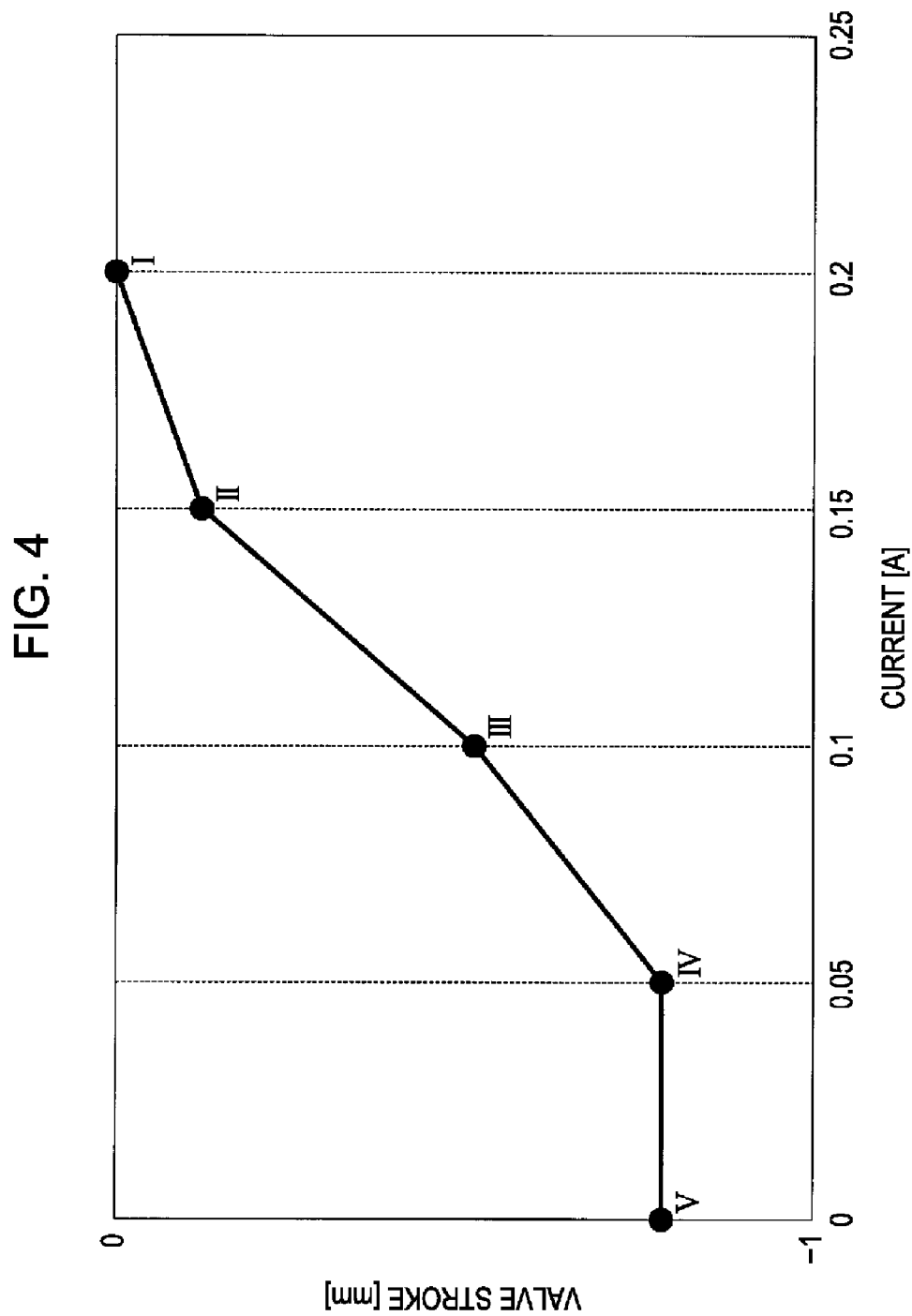
FIG. 4 is a graph explaining the relationship between applied currents to the linear solenoid valve and strokes of a spool in FIG. 3.

The configuration (structure) of the linear solenoid valve and the control for the linear solenoid valve according to this embodiment will be described below. Here, a first linear solenoid valve 41 is described. FIG. 3 is a partly sectioned view of the first linear solenoid valve 41. FIG. 4 is a graph explaining the relationship between applied currents to the first linear solenoid valve 41 (shown in FIG. 3) and strokes of the spool 41a.

The linear solenoid valve 41 in this embodiment is a linear solenoid valve of a normally closed type, and includes an outer sleeve 41g, a spool 41a, and a solenoid drive 41f that define a spool device. The spool device also includes a spring 41b. The spring 41b contacts the left end of the spool 41a, and presses the spool 41a toward the right side. The spool 41a has a spool groove 41d extending from a center portion in the longitudinal direction of the spool 41a toward the right side. Though not shown, a coil is wound around the shaft of the solenoid drive 41f, the shaft extending in the longitudinal direction. The coil linearly generates an electromagnetic force by an applied current (a supply current). The shaft presses the spool 41a toward the left side in accordance with the current value supplied to the solenoid drive 41f.

The spool device includes an input port 41c that is coupled with a fluid channel from the hydraulic pump OP that provides a source pressure, and an output port 41e that supplies a linear solenoid output fluid pressure to a corresponding clutch. In the state in FIG. 3, no current is supplied to the solenoid drive 41f. In other words, FIG. 3 illustrates a state of the spool device when the applied current is 0 A (not-regulated state).

Referring to FIG. 4, when the applied current is 0 A, a valve stroke of the first linear solenoid valve 41 is a negative value. The valve stroke of the spool 41a is located at a position V, that is, a movement end at which the output of the fluid pressure is stopped. In FIG. 3, an inner wall surface that is the boundary of the spool groove 41d in the longitudinal direction is located at a position indicated by a dotted line.

In this embodiment, when the applied current is 0.05 A, the valve stroke of the spool 41a of the first linear solenoid valve 41 is located at a position IV, and the spool 41a starts moving. When the applied current increases from 0.05 to 0.2 A, the valve stroke of the spool 41a progressively moves from the position IV, to a position III, a position II, and then a position I. In the state at the position I, the spool 41a is balanced such that the inner wall surface of the spool groove 41d of the spool 41a is substantially flush with the inner wall surface of the input port 41c. In FIG. 3, the spool 41a in the state at the position I is illustrated below the figure of the first linear solenoid valve 41.

In the document '014 of related art, the valve stroke in the not-regulated state is at the position V, and the responsiveness of the linear solenoid valve may be degraded. If the speed change is predicted or determined, the state is changed to the regulated state in advance. Then, the valve stroke becomes at the position I. For example, if the engine speed is high, the automatic transmission fluid may leak to the output port. As a result, the consumption flow of the automatic transmission fluid may increase, and the slipping of the clutch may occur.

In this embodiment, when the first linear solenoid valve 41 is not used, the AT-ECU 5 sets the valve stroke to the state at the position III, i.e., the regulated low flow state, and when the first linear solenoid valve 41 is used, i.e., in the normal regulated state, the AT-ECU 5 sets the valve stroke to the position II as a balanced position of the spool 41a. The leak of the automatic transmission fluid in the regulated state can be minimized. Also, even when the first linear solenoid valve 41 is not used, the spool 41a does not return to the movement end at which the output of the fluid pressure is stopped. Accordingly, the responsiveness of the first linear solenoid valve 41 when the start of use can be provided, and the control fluid pressure can be effectively prevented from being decreased.

Referring back to FIG. 2, in a linear solenoid valve setting process, if the automatic transmission 2 is in a steady state at a first speed stage or a second speed stage, if the temperature TTC of the torque converter 3 estimated by the torque converter temperature estimating unit 504 is a predetermined temperature or lower, if the rotation speed Ne of the engine 1 acquired by the engine speed acquiring unit 503 is a predetermined speed or lower, and if the vehicle speed Nv of the vehicle acquired by the vehicle speed acquiring unit 505 is a predetermined vehicle speed or lower, the linear solenoid mode changing device 506 changes the mode of the unused linear solenoid valve included in the linear solenoid valves 41 to 44 from the normal hydraulic control mode to the current consumption decrease mode.

In the linear solenoid valve setting process, if the automatic transmission 2 is in the steady state at the first speed stage or the second speed stage, if the temperature TTC of the torque converter 3 estimated by the torque converter temperature estimating unit 504 is higher than the predetermined temperature, and if the vehicle speed Nv of the vehicle acquired by the vehicle speed acquiring unit 505 is the predetermined speed or lower, the linear solenoid mode changing device 506 changes the mode of the unused linear solenoid valve included in the linear solenoid valves 41 to 44 from the normal hydraulic control mode to the current consumption decrease mode.

In the linear solenoid valve setting process, if the automatic transmission 2 is in the steady state at any speed stage of third to sixth speed stages, or if the automatic transmission 2 performs upshift or downshift from a current speed stage to a target speed stage, and if the rotation speed Ne of the engine 1 acquired by the engine speed acquiring unit 503 is the predetermined speed or lower, the linear solenoid mode changing device 506 changes the mode of the unused linear solenoid valve included in the linear solenoid valves 41 to 44 from the normal hydraulic control mode to the current consumption decrease mode.

In the linear solenoid valve setting process, if the rotation speed Ne of the engine 1 acquired by the engine speed acquiring unit 503 is the predetermined rotation speed or lower, and if the automatic transmission 2 is in the in-gear state with any of the speed stages, the linear solenoid mode changing device 506 changes the mode of the unused linear solenoid valve included in the linear solenoid valves 41 to 44 from the normal hydraulic control mode to the current consumption decrease mode.

As described above, in the linear solenoid valve setting process, if it is expected that the consumption flow at the unused linear solenoid valve included in the linear solenoid valves 41 to 44 increases, or if the discharge flow of the hydraulic pump OP decreases, the linear solenoid mode changing device 506 of the AT-ECU 5 controls a spool included in the spools 41a to 44a corresponding to the unused linear solenoid valve included in the linear solenoid valves 41 to 44 such that the valve stroke of the spool included in the spools 41a to 44a is held at the position III in FIG. 4. In particular, the linear solenoid mode changing device 506 changes the current (applied current), which is to be supplied to the unused linear solenoid valve included in the linear solenoid valves 41 to 44, from 0.15 A under the normal hydraulic control mode to 0.1 A under the current consumption decrease mode, and controls the current to be supplied to a drive included in the solenoid drives 41f to 44f corresponding to the unused linear solenoid valve included in the linear solenoid valves 41 to 44.

Figure 5:
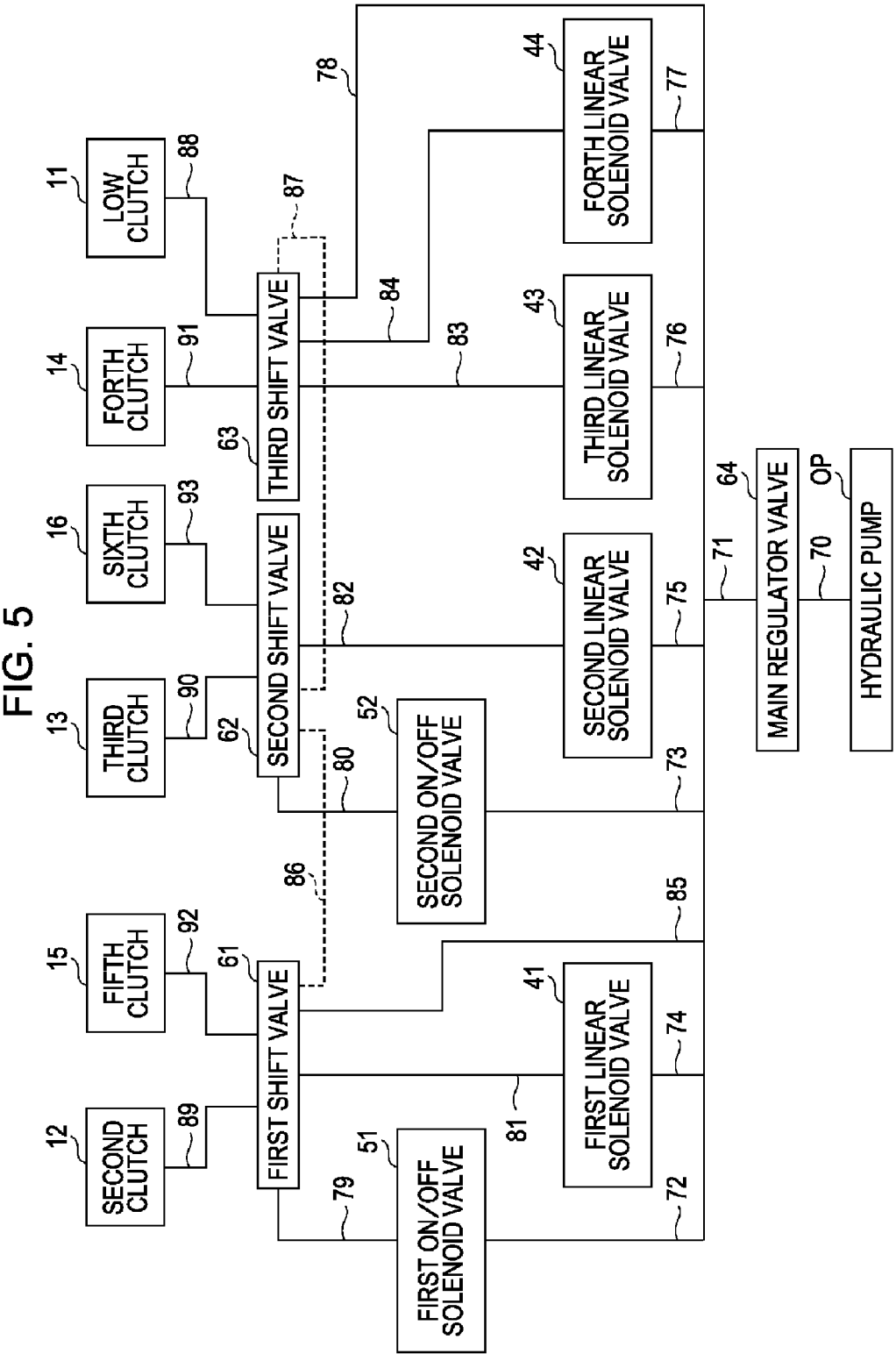
FIG. 5 partly illustrates a hydraulic circuit in the hydraulic control apparatus in FIG. 1.

Next, a hydraulic circuit of the hydraulic control apparatus 6 of the automatic transmission 2 according to this embodiment will be described below with reference to a hydraulic circuit in FIG. 5. FIG. 5 is part of a schematic hydraulic circuit diagram in the hydraulic control apparatus 6 in FIG. 1.

The hydraulic control apparatus 6 of the automatic transmission 2 according to this embodiment includes the fluid tank serving as a fluid pressure source; the hydraulic pump OP that discharges the automatic transmission fluid in the fluid tank; the clutches serving as the plurality of frictional engagement elements to select one of a plurality of power transmission paths for the automatic transmission 2, the clutches including a LOW clutch 11, a second clutch 12, a third clutch 13, a fourth clutch 14, a fifth clutch 15, and a sixth clutch 16; a main regulator valve 64 that regulates the line pressure PL serving as a base pressure for actuating the LOW clutch 11 to the sixth clutch 16 serving as the plurality of frictional engagement elements, by using the fluid pressure supplied from the hydraulic pump OP; and a hydraulic control valve group that performs supply control of an engagement control fluid pressure to the plurality of frictional engagement elements.

The hydraulic control valve group includes the first to fourth linear solenoid valves 41 to 44 that can desirably regulate the line pressure PL, for example, in the in-gear state at the first speed; first to third shift valves 61 to 63 that select fluid channels such that the line pressure or a speed change control fluid pressure regulated by the first to fourth linear solenoid valves 41 to 44 is selectively supplied to one of the LOW clutch 11 to the sixth clutch 16 serving as the plurality of frictional engagement elements; and first and second on/off solenoid valves 51 and 52 that supply an actuation control fluid pressure to the first to third shift valves 61 to 63 and control the actuation of the first to third shift valves 61 to 63.

The hydraulic pump OP is driven by the engine 1 through the pump driving gear 37 of the torque converter 3. The hydraulic pump OP draws the automatic transmission fluid from the fluid tank (not shown) through a strainer (not shown) and pumps the drawn automatic transmission fluid to a fluid channel 70. Thus, the automatic transmission fluid is supplied to the main regulator valve 64 through the fluid channel 70.

The main regulator valve 64 regulates the pressure of the automatic transmission fluid supplied from the hydraulic pump OP based on the stator reaction force of the torque converter 3 and generates the line pressure PL serving as the source pressure of the engagement actuation fluid pressure for the LOW clutch 11 to the sixth clutch 16 serving as the plurality of frictional engagement elements, in a fluid channel 71. The fluid channel 71 is connected with fluid channels 74 to 76 when the shift range is a drive (D) range. The automatic transmission fluid at the line pressure PL is supplied to the first to third linear solenoid valves 41 to 43 through the fluid channels 74 to 76.

The fluid channel 71 is continuously connected with input ports of the first and second on/off solenoid valves 51 and 52 and an input port of the fourth linear solenoid valve 44 respectively through fluid channels 72, 73, and 77. Opening and closing of the first and second on/off solenoid valves 51 and 52 and the first to fourth linear solenoid valves 41 to 44 are controlled when the AT-ECU 5 supplies an electric current thereto.

The actuation of the hydraulic control apparatus 6 of the automatic transmission 2 having the above-described configuration will be described below for each of the speed stages. The AT-ECU 5 sets each of the speed stages by setting the actuation of the first and second on/off solenoid valves 51 and 52 and the first to fourth linear solenoid valves 41 to 44 as shown in a table in FIG. 6. FIG. 6 illustrates the relationship between speed change modes (speed stages) in a forward (travel) range (D position), and actuation states of the first and second on/off solenoid valves 51 and 52 and of the first to fourth linear solenoid valves 41 to 44.

The first and second on/off solenoid valves 51 and 52, and the first to fourth linear solenoid valves 41 to 44 each are a solenoid valve of a normally closed type. The first to fourth linear solenoid valves 41 to 44 generate signal fluid pressures for the first to third shift valves 61 to 63 when the solenoid valves are actuated (opened) while electric currents are applied (ON).

In FIG. 6, a cross (X) and a circle (O) in the actuation states of the first and second on/off solenoid valves 51 and 52 respectively indicate an OFF state and an ON state of the application of the electric current. Also, "pressure increase," "pressure decrease," and "OFF" in the actuation states of the linear solenoid valves 41 to 44 respectively indicate a state in which the current value of each of the solenoid drives 41*f* to 44*f* of the linear solenoid valves 41 to 44 gradually increases when the electric current is ON, a state in which the current value gradually decreases when the electric current is ON (in the normal regulated state), and a state in which the electric current is OFF (in the regulated low flow state). A mode column in FIG. 6 indicates part of control modes when the operation position of the shift lever 8*a* is in the D range.

In this embodiment, the linear solenoid valves 41 to 44 are controlled to be in the regulated low flow state when the electric current is OFF. Owing to this, the modes shown in the table in FIG. 6, the modes which correspond to the speed change control for typical positions in the D range, will be described. The speed change control for the other positions will not be described.

When the shift lever 8*a* is operated to be in the forward (D) position, a plurality of typical modes shown in FIG. 6 are set. Alternatively and additionally, other modes, for example, a 1-3 UP mode or a 3-1 DOWN mode may be set in which upshift or downshift is performed by every two speed stages.

First, a LOW (first speed) in-gear mode will be described. The LOW in-gear mode is set in an initial phase when the shift lever 8*a* is operated from a neutral (N) position to a forward (D) position. In this mode, the fourth linear solenoid valve 44 is ON, and the second and third linear solenoid valves 42 and 43 are OFF. Also, the first on/off solenoid valve 51 is ON, and the second on/off solenoid valve 52 is OFF. Thus, the line pressure PL is supplied from the fluid channel 72, which is branched from the fluid channel 71, to a fluid channel 79 at an output port of the first on/off solenoid valve 51. The fluid channel 79 is connected with a left end port of the first shift valve 61 and is actuated. A fluid channel 81 is connected with a fluid channel 89. A fluid channel 85 is connected with a fluid channel 86.

The pressure in a fluid channel 80, to which the output fluid pressure of the second on/off solenoid valve 52 is supplied, becomes zero or an extremely low pressure. The fluid channel 80, to which the output fluid pressure of the second on/off solenoid valve 52 is supplied, is connected with a left end port of the second shift valve 62. Since the fluid pressure acting on the left end port is zero, the second shift valve 62 is de-actuated, and the fluid channel 86 is connected with a fluid channel 87.

As described above, the fluid channel 85 branched from the fluid channel 71 is connected with the fluid channel 86 through the first shift valve 61, and hence the line pressure PL supplied to the fluid channel 86 is supplied to the fluid channel 87 through the second shift valve 62. The fluid channel 87 is connected with a right end port of the third shift valve 63. Accordingly, the third shift valve 63 is actuated, and the fluid channel 84 is connected with a fluid channel 88.

In the initial phase of the first speed in-gear mode, the first shift valve 61 and the third shift valve 63 are actuated, whereas the second shift valve 62 is de-actuated. In this state, the engagement control of the LOW clutch 11 is performed by using the engagement control fluid pressure, which is output from the fourth linear solenoid valve 44 and is supplied to the LOW clutch 11 through the fluid channels 84 and 88.

The fluid channel 71 is connected with an input port of the third linear solenoid valve 43 through the fluid channel 76. However, since the third linear solenoid valve 43 is OFF, the output fluid pressure to a fluid channel 83 is zero. The automatic transmission fluid at the line pressure PL supplied to the fluid channel 71 is also supplied to the first and second linear solenoid valves 41 and 42 through the fluid channels 74 and 75, which are branched from the fluid channel 71. However, since the first and second linear solenoid valves 41 and 42 are also OFF, the output fluid pressure to fluid channels 81 and 82 are zero.

Under the first speed in-gear mode, the second clutch 12 is connected with an output port of the first linear solenoid valve 41 through the fluid channel 89, the first shift valve 61, and the fluid channel 81 so that the fluid for the second clutch 12 is drained; the fluid for the third clutch 13 is drained from the second shift valve 62 through a fluid channel 90; the fluid for the fourth clutch 14 is drained from the third shift valve 63 through a fluid channel 91; the fluid for the fifth clutch 15 is drained from the first shift valve 61 through a fluid channel 92; and the sixth clutch 16 is connected with the output port of the second linear solenoid valve 42 through a fluid channel 93, the second shift valve 62, and the fluid channel 82 so that the fluid for the sixth clutch 16 is drained; resulting in that these clutches being open.

As described above, under the first speed in-gear mode, the applied current is not supplied to the first to third linear solenoid valves 41 to 43, and hence, the linear solenoid valves 41 to 43 are OFF. In this embodiment, the second and third linear solenoid valves 42 and 43 are set to the current consumption decrease mode under a predetermined condition. Accordingly, the current consumption can be minimized, and the control fluid pressure under the first speed in-gear mode can be prevented from being decreased.

Next, a first speed steady mode will be described. Under the first speed steady mode, the second on/off solenoid valve 52 is ON from the state of the first speed in-gear mode. Accordingly, the line pressure PL is supplied to the fluid channel 80, the second shift valve 62 is actuated, and the fluid channels 86 and 87 are disconnected. As a result, the fluid channel 82 is connected with the fluid channel 90 through the second shift valve 62. However, since the second linear solenoid valve 42 is OFF, the output fluid pressure of the second linear solenoid valve 42 is not supplied to the third clutch 13.

As described above, since the second shift valve 62 is actuated, the fluid pressure acting on the right end port of the third shift valve 63 becomes zero, and the third shift valve 63 is de-actuated. At this time, a fluid channel 78 is connected with the fluid channel 88 through the third shift valve 63. In this state, the engagement of the LOW clutch 11 is held by using the engagement control fluid pressure at the line pressure PL supplied to the fluid channel 88.

Thus, under the first speed steady mode, the applied current is not supplied to any of the first to third (fourth) linear solenoid valves 41 to 43 (44), and hence, the linear solenoid valves 41 to 43 (44) are OFF. In this embodiment, the first to fourth linear solenoid valves 41 to 44 are set to the current consumption decrease mode under a predetermined condition. Accordingly, the current consumption can be minimized, and the control fluid pressure under the first speed steady mode can be prevented from being decreased.

Next, the speed change control from the first speed steady mode, in which the LOW (first speed) speed stage is set, to a second speed stage will be described. In this situation, a 1-2 UP mode is set, and then a second speed steady mode is set, to attain the speed change to the second speed stage.

Under the 1-2 UP mode, the first linear solenoid valve 41 is actuated for pressure increase from the state under the first speed steady mode. Under the 1-2 UP mode, referring to FIG. 6, the first linear solenoid valve 41 becomes the pressure increase state, and the control fluid pressure output from the first linear solenoid valve 41 is used. In the state in which the engagement control of the LOW clutch 11 is performed, the control fluid pressure output to the fluid channel 81 from the first linear solenoid valve 41 is supplied to the fluid channel 89 through the actuated first shift valve 61, and supplied to the second clutch 12 through the fluid channel 89, to perform the engagement control of the second clutch 12. The fluid channel 85 branched from the fluid channel 71 is connected with the fluid channel 86 through the first shift valve 61. However, the fluid channel 86 is blocked by the actuated second shift valve 62.

Under the 1-2 UP mode, the speed change control from the first speed stage to the second speed stage is performed through the control to engage the second clutch 12 by gradually increasing the output fluid pressure of the first linear solenoid valve 41. Though not shown in FIG. 1, the automatic transmission 2 includes a one-way clutch provided between the LOW clutch 11 and the shaft fixed to the LOW clutch 11 in the engaged state (for example, the secondary shaft). Thus, the first speed stage can be released by stopping the rotational driving of the shaft without the LOW clutch 11 being disengaged.

Under the 1-2 UP mode, while the LOW clutch 11 is engaged, when the rotational driving of the shaft corresponding to the LOW clutch 11 is stopped and when the second clutch 12 is engaged, the 1-2 UP mode shifts to a second speed steady mode. Under the second speed steady mode, the output fluid pressure of the first linear solenoid valve 41 becomes the maximum pressure, that is, the line pressure PL from the state under the 1-2 UP mode, and the second clutch 12 is completely engaged.

Under the 1-2 UP mode and the second speed steady mode, the applied current is not supplied to any of the second and third linear solenoid valves 42 and 43, and the linear solenoid valves 42 and 43 are OFF. In this embodiment, the second and third linear solenoid valves 42 and 43 are set to the current consumption decrease mode under a predetermined condition. Accordingly, the current consumption can be minimized, and the control fluid pressure under the 1-2 UP mode and the second speed steady mode can be prevented from being decreased.

Next, the speed change control from the second speed steady mode, in which the second speed stage is set, to a third speed stage will be described. In this situation, a 2-3 UP mode is set, and then a third speed steady mode is set, to attain the speed change to the second speed stage.

Under the 2-3 UP mode, the first linear solenoid valve 41 is actuated for pressure decrease from the state under the second speed steady mode, and the second linear solenoid valve 42 is actuated for pressure increase. Accordingly, the increased control fluid pressure is supplied to the fluid channel 82 connected with the output port of the second linear solenoid valve 42, the fluid channel 82 is connected with the fluid channel 90 through the actuated second shift valve 62, and the control fluid pressure is supplied to the third clutch 13 through the fluid channel 90, for the engagement control of the third clutch 13.

The control fluid pressure output to the fluid channel 81 from the first linear solenoid valve 41 is supplied to the second clutch 12 through the actuated first shift valve 61 and the fluid channel 89. At this time, since the first linear solenoid valve 41 is actuated for the pressure decrease, the second clutch 12 is gradually disengaged.

As described above, under the 2-3 UP mode, while the second clutch 12 is disengaged by using the control fluid pressure from the first linear solenoid valve 41, the third clutch 13 is engaged by using the control fluid pressure from the second linear solenoid valve 42, to perform the speed change control from the second speed stage to the third speed stage.

Under the 2-3 UP mode, when the second clutch 12 is disengaged and the third clutch 13 is engaged, the 2-3 UP mode shifts to the third speed steady mode. Under the third speed steady mode, the first linear solenoid valve 41 is OFF from the state under the 2-3 UP mode, the output fluid pressure of the second linear solenoid valve 42 becomes the maximum pressure, that is, the line pressure PL, and the third clutch 13 is completely engaged. Also, the first on/off solenoid valve 51 is OFF, and the first shift valve 61 is de-actuated.

Under the 2-3 UP mode, the applied current is not supplied to the third linear solenoid valve 43. Under the third speed steady mode, the applied current is not supplied to any of the first and third linear solenoid valve 41 and 43, and the linear solenoid valve 43 or the linear solenoid valves 41 and 43 are OFF. In this embodiment, the first and third linear solenoid valves 41 and 43 are set to the current consumption decrease mode under a predetermined condition. Accordingly, the current consumption can be minimized, and the control fluid pressure under the 2-3 UP mode and the third speed steady mode can be prevented from being decreased.

Similarly, speed change control from the third speed stage to a fourth speed stage, speed change control from the fourth speed stage to a fifth speed stage, and speed change control from the fifth speed stage to a sixth speed stage are performed through ON and OFF actuation for the valves based on an actuation table (not shown). The technical feature according to this embodiment of the invention is to prevent the control fluid pressure under each mode from being decreased by setting the unused linear solenoid valve to the current consumption decrease mode under the predetermined condition. Hence, the detailed description for the speed change control for all the UP modes will be omitted.

Next, several examples of speed change control for a DOWN mode will be described below. For an example of speed change control for the DOWN mode, speed change control from the third steady mode, in which the third speed stage is set, to the second speed stage will be described. In this situation, a 3-2 DOWN mode is set, and then the second speed steady mode is set, to attain the speed change to the second speed stage.

Under the 3-2 DOWN mode, the first on/off solenoid valve 51 is ON from the state under the third speed steady mode, the first linear solenoid valve 41 is actuated for pressure increase, and the second linear solenoid valve 42 is actuated for pressure decrease. Accordingly, the increased control fluid pressure is supplied to the fluid channel 81 connected with the output port of the first linear solenoid valve 41, the fluid channel 81 is connected with the fluid channel 89 through the actuated first shift valve 61, and the control fluid pressure is supplied to the second clutch 12 through the fluid channel 89, for the engagement control of the second clutch 12.

The control fluid pressure output to the fluid channel 82 from the second linear solenoid valve 42 is supplied to the third clutch 13 through the fluid channel 82, the actuated second shift valve 62, and the fluid channel 90. At this time, since the second linear solenoid valve 42 is actuated for the pressure decrease, the third clutch 13 is gradually disengaged.

As described above, under the 3-2 DOWN mode, while the third clutch 13 is disengaged by using the control fluid pressure from the second linear solenoid valve 42, the second clutch 12 is engaged by using the control fluid pressure from the first linear solenoid valve 41, to perform the speed change control from the third speed stage to the second speed stage.

Under the 3-2 DOWN mode, when the third clutch 13 is disengaged and the second clutch 12 is engaged, the 3-2 DOWN mode shifts to the second speed steady mode. Under the second speed steady mode, the second linear solenoid valve 42 is OFF from the state in the 3-2 DOWN mode, the output fluid pressure of the first linear solenoid valve 41 becomes the maximum pressure, that is, the line pressure PL, and the second clutch 12 is completely engaged.

Under the 3-2 DOWN mode, the applied current is not supplied to any of the third linear solenoid valve 43. Under the second speed steady mode, the applied current is not supplied to the second and third linear solenoid valves 42 and 43, and the linear solenoid valve 43 or the linear solenoid valves 42 and 43 are OFF. In this embodiment, the second and third linear solenoid valves 42 and 43 are set to the current consumption decrease mode under a predetermined condition. Accordingly, the current consumption can be minimized, and the control fluid pressure under the 3-2 DOWN mode and the second speed steady mode can be prevented from being decreased.

Similarly, speed change control from the sixth speed stage to the fifth speed stage, speed change control from the sixth speed stage to the fourth speed stage, speed change control from the fifth speed stage to the fourth speed stage, etc., are performed through ON and OFF actuation for the valves based on an actuation table (not shown). The technical feature according to this embodiment of the invention is to prevent the control fluid pressure under each mode from being decreased by setting the unused linear solenoid valve to the current consumption decrease mode under the predetermined condition. Hence, the detailed description for the speed change control for all the DOWN modes will be omitted.

Next, the control concept of the hydraulic control apparatus 6 of the automatic transmission 2 according to this embodiment will be described below with reference to a timing chart in FIG. 7. FIG. 7 is a timing chart illustrating the relationship between states of the vehicle when the vehicle is in the steady state at the first speed, and applied currents to the linear solenoid valves. In this embodiment, referring to FIG. 6, the first to third linear solenoid valves 41 to 43 are not used in the steady state at the first speed. Although it is not described above, if the lockup control is not performed, the fourth linear solenoid valve 44 is not used.

When the vehicle travels, if the vehicle speed Nv and the rotation speed Ne of the engine 1 are gradually decreased as the vehicle decelerates, the rotation speed of the hydraulic pump OP is decreased in accordance with the decrease in the rotation speed Ne of the engine 1, and the line pressure PL is decreased. If the vehicle speed Nv becomes equal to or lower than a predetermined vehicle speed at which the line pressure PL is changed to a standby pressure, and if the rotation speed Ne of the engine 1 becomes equal to or lower than a predetermined rotation speed at which the line pressure PL is changed to the standby pressure (in FIG. 7, timing A), the AT-ECU 5 changes (switches) the current value, which is applied (supplied) to the first to third linear solenoid valves 41 to 43 (and to the fourth linear solenoid valve 44 if the lockup control is not performed), from the state (0.15 A) at the position II to the state (0.1 A) at the position III shown in FIG. 4. Accordingly, the automatic transmission fluid at the line pressure PL can be prevented from leaking from the unused linear solenoid valve included in the first to third (and fourth) linear solenoid valves 41 to 43 (44), and the line pressure PL is increased by a step from the original state (indicated by a dotted-chain line) as shown in FIG. 7. Thus, even if the rotation speed Ne of the engine 1 is low and hence the discharge pressure of the hydraulic pump OP is low, the line pressure can be effectively prevented from being decreased.

If the vehicle speed Nv is decreased and the vehicle speed Nv finally becomes zero (or the vehicle is stopped), the FI-ECU 4 controls the rotation speed Ne of the engine 1 to an idle rotation speed. At this time, the line pressure PL becomes the minimum pressure.

Then, in the stop state of the vehicle, if a driver depresses the accelerator pedal 7, the rotation speed Ne of the engine 1 rapidly increases. For example, in a stall state in which the vehicle does not start moving (does not move) in the initial phase like starting the vehicle on a grade, the rotation speed Ne of the engine 1 increases, and the estimated temperature TTC in the torque converter 3 estimated by the torque converter temperature estimating unit 504 gradually increases. If the rotation speed Ne of the engine 1 is higher than a predetermined rotation speed (in FIG. 7, timing B), the rotation speed of the hydraulic pump OP also increases and the line pressure PL becomes sufficiently high. The AT-ECU 5 changes (switches) the current value, which is applied (supplied) to the first to third linear solenoid valves 41 to 43 (and to the fourth linear solenoid valve 44 if the lockup control is not performed), from the state (0.1 A) at the position III to the state (0.15 A) at the position II shown in FIG. 4. Accordingly, the line pressure PL is decreased by a step as shown in FIG. 7. However, since the line pressure PL is sufficiently high, the decrease in the line pressure PL does not adversely affect the fluid pressure control.

If the driver keeps depressing the accelerator pedal 7 but the stall state is not recovered (i.e., if the vehicle does not start moving), the internal pressure of the torque converter 3 increases as the line pressure PL increases. If the estimated temperature TTC in the torque converter 3 further increases and the estimated temperature TTC becomes higher than a predetermined temperature at which the line pressure PL is changed to the standby pressure (in FIG. 7, timing C), the AT-ECU 5 changes (switches) the current value, which is applied (supplied) to the first to third linear solenoid valves 41 to 43 (and to the fourth linear solenoid valve 44 if the lockup control is not performed), from the state (0.15 A) at the position II to the state (0.1 A) at the position III shown in FIG. 4. Accordingly, the automatic transmission fluid at the line pressure PL can be prevented from leaking from the unused linear solenoid valve included in the first to third (and fourth) linear solenoid valves 41 to 43 (44), and the internal pressure of the torque converter 3 can be increased by a step. Thus, the driving torque from the torque converter 3 is transmitted to the automatic transmission 2, so that the slip ratio ETR of the torque converter 3 can be increased. The stall state, in which the vehicle does not start moving although the rotation speed Ne of the engine 1 is sufficiently high, can be recovered.

Figure 9:
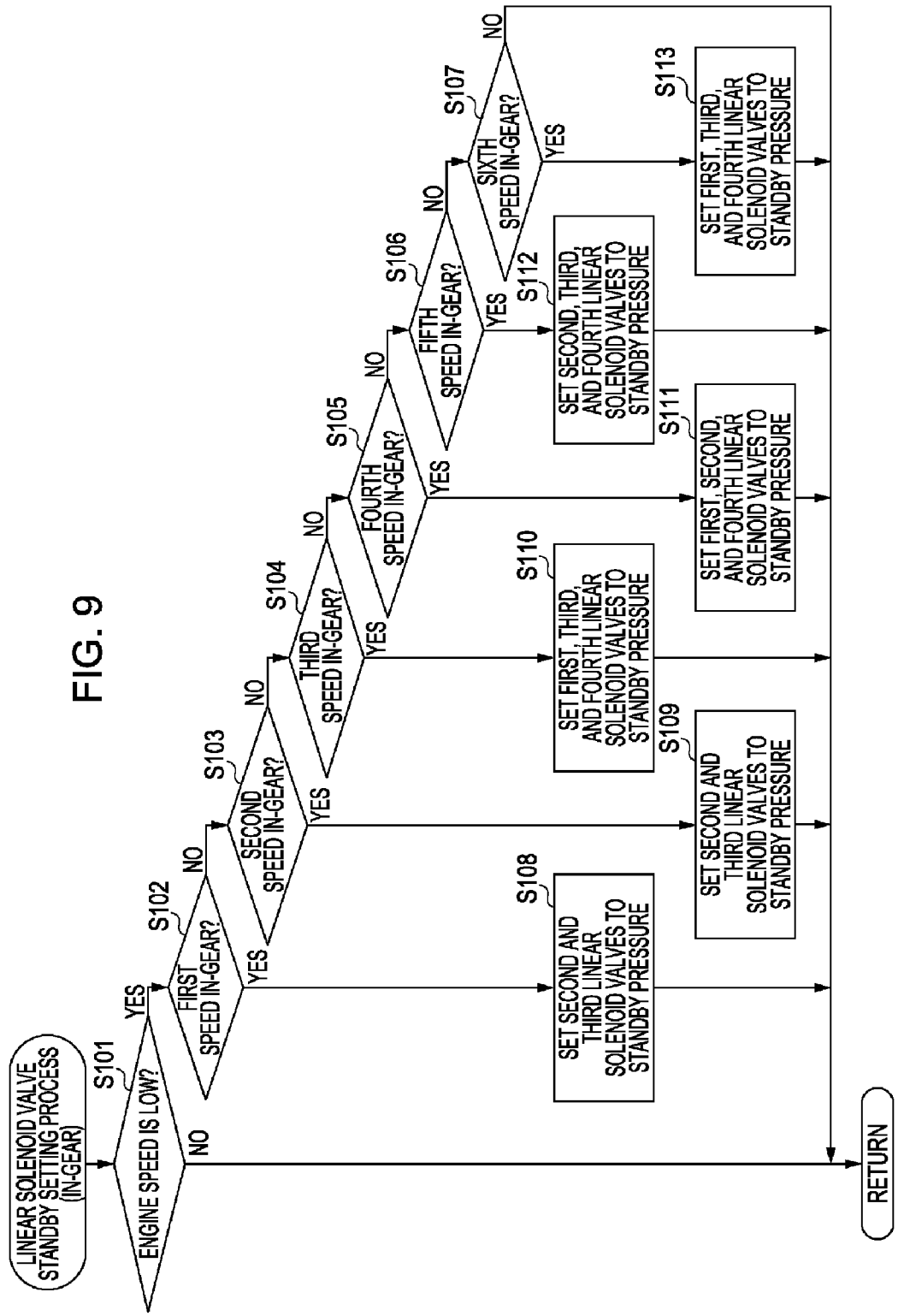
FIG. 9 is a flowchart of a linear solenoid valve standby setting process (in-gear) executed in step S3 of the linear solenoid valve setting process in FIG. 8.
Figure 10:
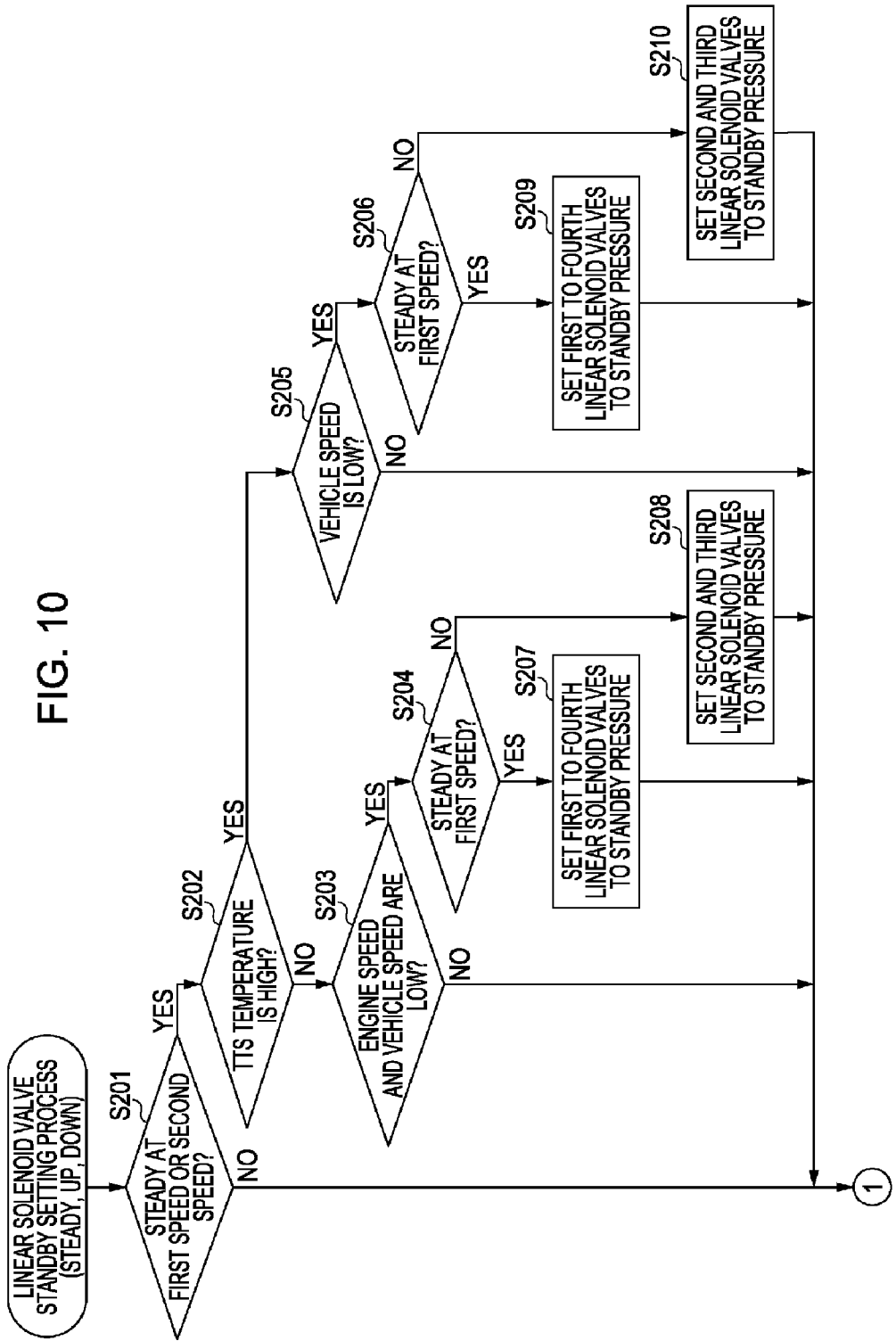
FIG. 10 is a flowchart of a linear solenoid valve standby setting process (steady, UP, DOWN) executed in step S4 of the linear solenoid valve setting process in FIG. 8.
Figure 11:
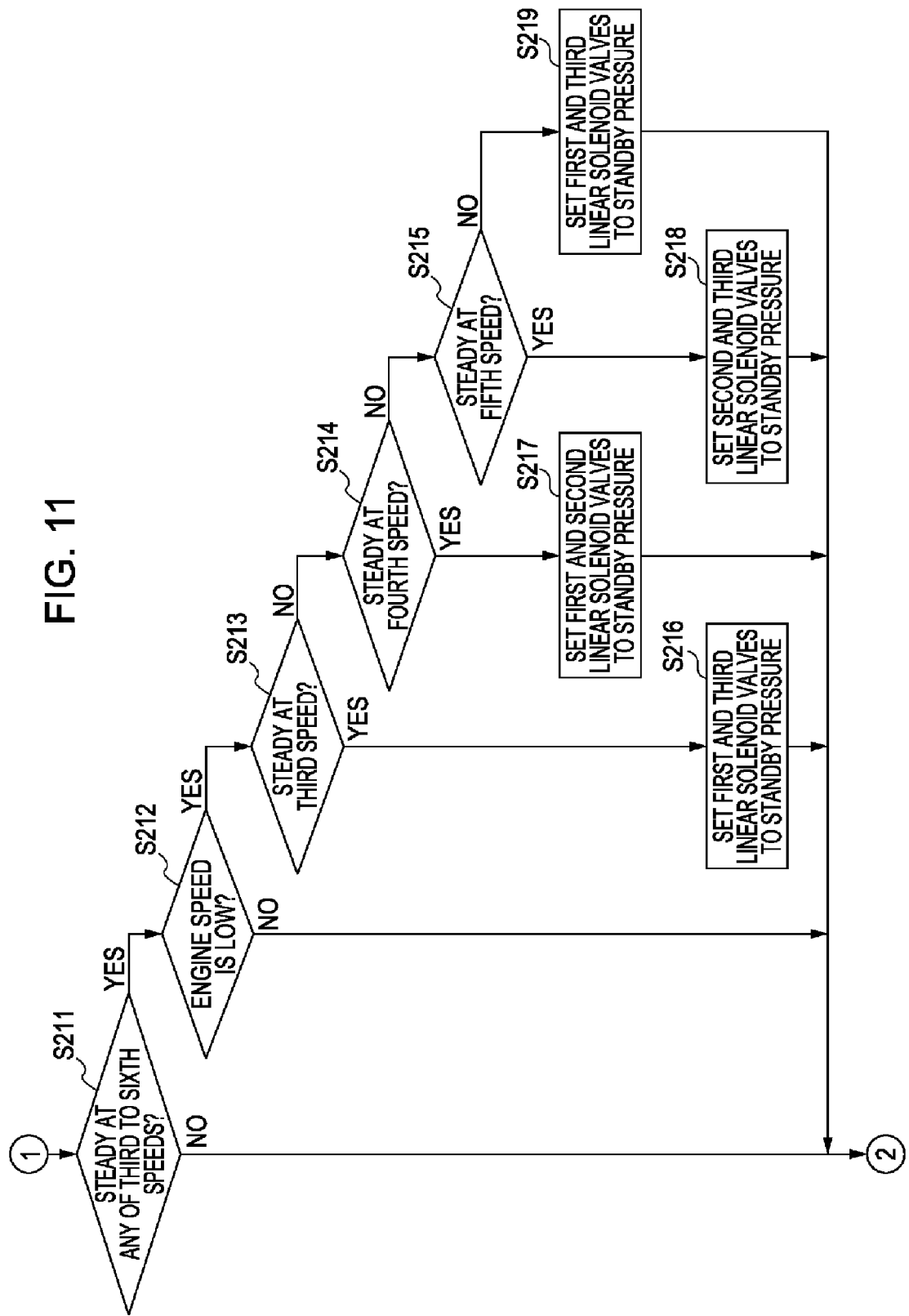
FIG. 11 is a flowchart of the linear solenoid valve standby setting process (steady, UP, DOWN) executed in step S4 of the linear solenoid valve setting process in FIG. 8.
Figure 12:
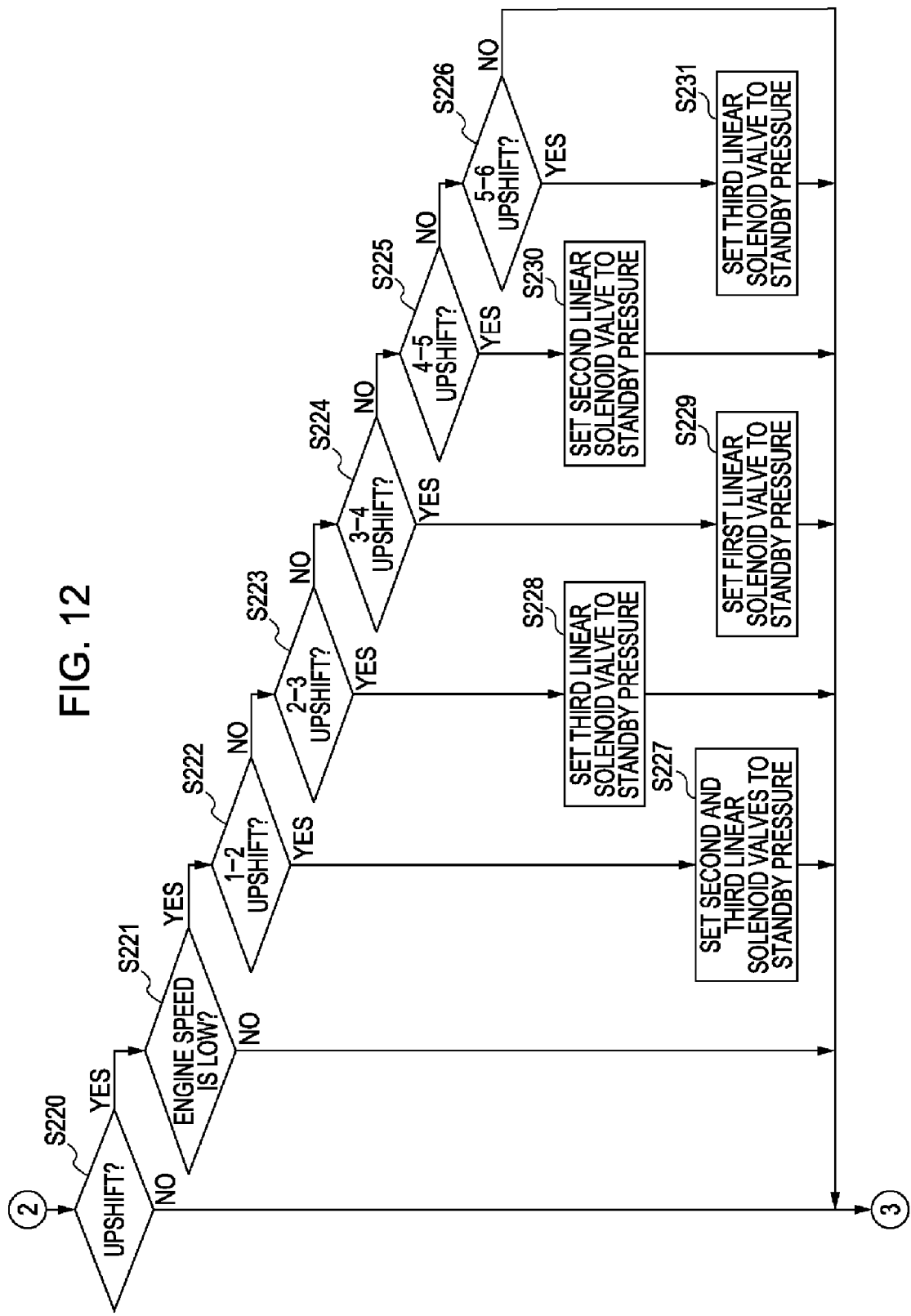
FIG. 12 is a flowchart of the linear solenoid valve standby setting process (steady, UP, DOWN) executed in step S4 of the linear solenoid valve setting process in FIG. 8.
Figure 13:
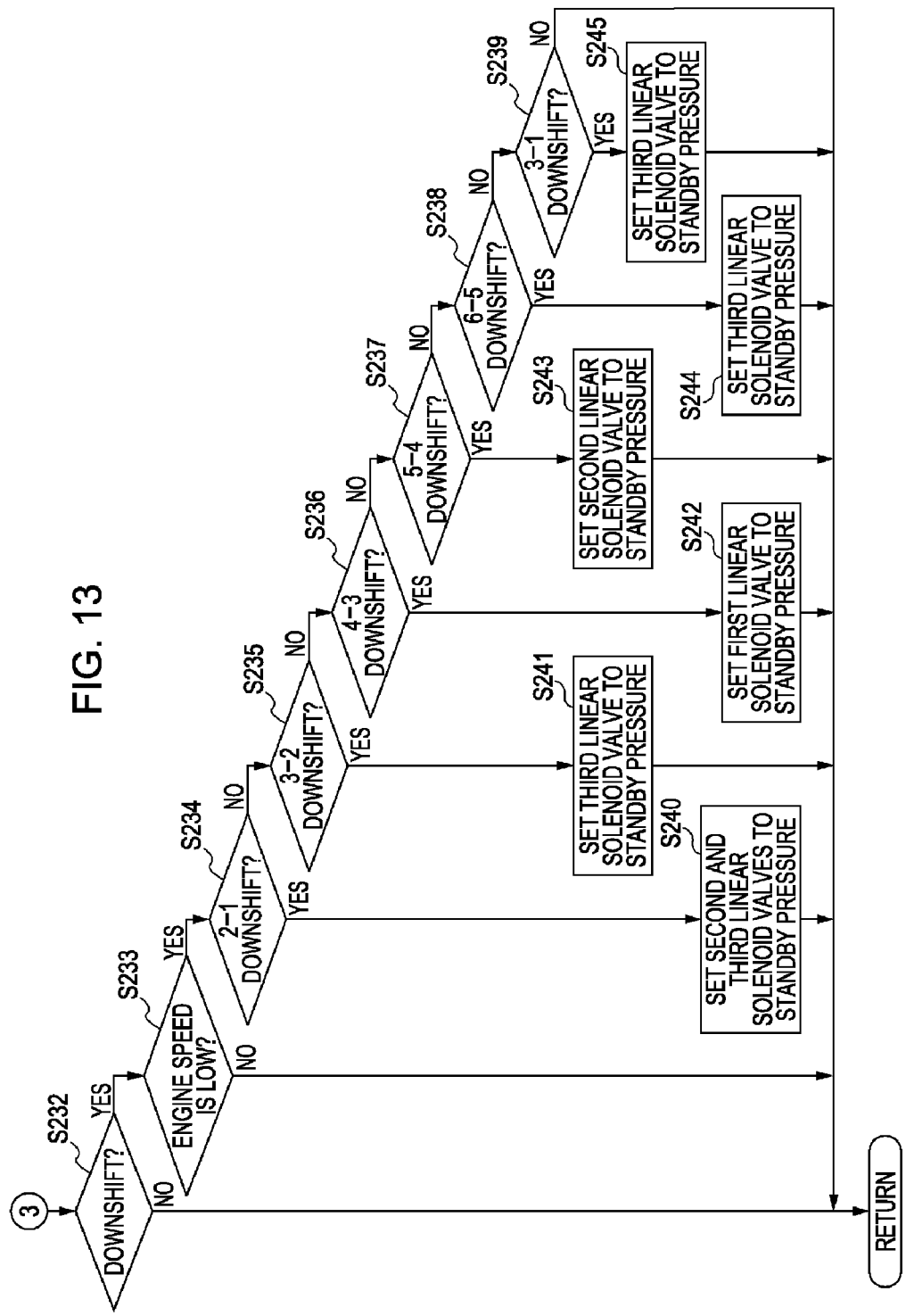
FIG. 13 is a flowchart of the linear solenoid valve standby setting process (steady, UP, DOWN) executed in step S4 of the linear solenoid valve setting process in FIG. 8.

Next, the operation of the hydraulic control apparatus 6 of the automatic transmission 2, and the AT-ECU 5 according to this embodiment will be described with reference to the block diagram in FIG. 2 and flowcharts in FIGS. 8 to 13. FIG. 8 is a flowchart of a linear solenoid valve setting process executed by the AT-ECU 5 in FIG. 2. FIG. 9 is a flowchart of a linear solenoid valve standby setting process (in-gear) executed in step S3 of the linear solenoid valve setting process in FIG. 8, when each of the clutches 11 to 16 is in the in-gear state. FIGS. 9 to 13 are flowcharts of linear solenoid valve standby setting processes (steady, UP, DOWN) executed in step S4 of the linear solenoid valve setting process in FIG. 8, when each of the clutches 11 to 16 is in the steady state or subjected to upshift or downshift.

The linear solenoid valve setting process is executed, for example, when ignition is ON in the vehicle. The process is repeatedly executed at a predetermined timing (for example, every 10 msec) during driving of the engine 1.

In the linear solenoid valve setting process, the AT-ECU 5 reads applied current values under the normal hydraulic control mode and the current consumption decrease mode for the first to fourth linear solenoid valves 41 to 44, the values which are stored in a memory provided therein (not shown), and the AT\ECU 5 sets the current values under the normal hydraulic control mode for the first to fourth linear solenoid valves 41 to 44 (step S1).

Then, the AT-ECU 5 determines whether the fluid temperature TATF of the automatic transmission fluid (ATF) of the hydraulic control apparatus acquired from the fluid temperature sensor 208 by the fluid temperature acquiring unit 502 is higher than a predetermined temperature (step S2). If it is determined that the fluid temperature TATF of the ATF is the predetermined temperature or lower, the viscosity of the automatic transmission fluid may be high and the automatic transmission fluid less frequently leaks from the unused linear solenoid valve. The AT-ECU 5 ends the linear solenoid valve setting process.

In contrast, if it is determined that the fluid temperature TATF of the ATF is higher than the predetermined temperature, the AT-ECU 5 executes the linear solenoid valve standby setting process (in-gear) in accordance with the speed change state of the automatic transmission 2 (step S3), then executes the linear solenoid valve standby setting process (steady, UP, DOWN) (step S4), and ends the linear solenoid valve setting process. The current control state of the automatic transmission 2 may be checked (recognized) based on an instruction (command) from the AT-ECU 5 to the automatic transmission 2.

Next, the linear solenoid valve standby setting process (in-gear) executed in step S3 of the linear solenoid valve setting process will be described. The AT-ECU 5 determines whether the rotation speed Ne of the engine 1 acquired from the crankshaft rotation speed sensor 201 by the engine speed acquiring unit 503 is lower than a predetermined rotation speed (step S101). If it is determined that the rotation speed Ne of the engine 1 is the predetermined rotation speed or higher, the AT-ECU 5 ends the linear solenoid valve setting process (in-gear).

In contrast, if it is determined that the rotation speed Ne of the engine 1 is lower than the predetermined rotation speed, the AT-ECU 5 successively determines whether the current state is a first speed in-gear state (step S102), whether the current state is a second speed in-gear state (step S103), whether the current state is a third speed in-gear state (step S104), whether the current state is a fourth speed in-gear state (step S105), whether the current state is a fifth speed in-gear state (step S106), and whether the current state is a sixth speed in-gear state (step S107), in accordance with the travel state of the vehicle.

If it is determined that the current state is the first speed in-gear state, the AT-ECU 5 sets the second and third linear solenoid valves 42 and 43 to the regulated low flow state (standby pressure state) (or changes the applied current for the second and third linear solenoid valves 42 and 43 to 0.1 A (in the state at the position III in FIG. 4)) (step S108), and ends the linear solenoid valve standby setting process (in-gear). If it is determined that the current state is the second speed in-gear state, the AT-ECU 5 sets the second and third linear solenoid valves 42 and 43 to the regulated low flow state (standby pressure state) (step S109), and ends the linear solenoid valve standby setting process (in-gear). If it is determined that the current state is the third speed in-gear state, the AT-ECU 5 sets the first, third, and fourth linear solenoid valves 41, 43, and 44 to the regulated low flow state (standby pressure state) (step S110), and ends the linear solenoid valve standby setting process (in-gear).

If it is determined that the current state is the fourth speed in-gear state, the AT-ECU 5 sets the first, second, and fourth linear solenoid valves 41, 42, and 44 to the regulated low flow state (standby pressure state) (step S111), and ends the linear solenoid valve standby setting process (in-gear). If it is determined that the current state is the fifth speed in-gear state, the AT-ECU 5 sets the second, third, and fourth linear solenoid valves 42, 43, and 44 to the regulated low flow state (standby pressure state) (step S112), and ends the linear solenoid valve standby setting process (in-gear). If it is determined that the current state is the sixth speed in-gear state, the AT-ECU 5 sets the first, third, and fourth linear solenoid valves 41, 43, and 44 to the regulated low flow state (standby pressure state) (step S113), and ends the linear solenoid valve standby setting process (in-gear). In the in-gear state of each of the speed stages, since the applied current to the unused linear solenoid valve is decreased, the automatic transmission fluid can be prevented from leaking from the unused linear solenoid valve and hence the line pressure PL can be effectively prevented from being decreased.

Next, the linear solenoid valve standby setting process (steady, UP, DOWN) executed in step S4 of the linear solenoid valve setting process will be described. The AT-ECU 5 determines whether the current state is the steady state at the first or second speed (step S201) in accordance with the travel state of the vehicle. If it is determined that the current state is not the steady state at the first or second speed, the process flow shifts to step S211.

If it is determined that the current state is the steady state at the first or second speed, the AT-ECU 5 determines whether the temperature TTC of the torque converter 3 estimated by the torque converter temperature estimating unit 504 is higher than a predetermined temperature (step S202). If it is determined that the temperature TTC of the torque converter 3 is the predetermined temperature or lower, the AT-ECU 5 determines whether the rotation speed Ne of the engine 1 acquired from the crankshaft rotation speed sensor 201 by the engine speed acquiring unit 503 is lower than a predetermined rotation speed, and whether the vehicle speed Nv acquired from the vehicle speed sensor 204 by the vehicle speed acquiring unit 505 is lower (slower) than a predetermined vehicle speed (step S203). If it is determined that the rotation speed Ne of the engine 1 is the predetermined rotation speed or higher, or the vehicle speed Nv is the predetermined vehicle speed or higher, the process flow shifts to step S211.

In contrast, if it is determined that the rotation speed Ne of the engine 1 is lower than the predetermined rotation speed, and the vehicle speed Nv is lower than the predetermined vehicle speed, the AT-ECU 5 further determines whether the current state is the steady state at the first speed (step S204). If it is determined that the current state is the steady state at the first speed, the AT-ECU 5 sets the first to fourth linear solenoid valves 41 to 44 to the regulated low flow state (standby pressure state) (step S207). If it is determined that the current state is not the steady state at the first speed, that is, if the current state is the steady state at the second speed, the AT-ECU 5 sets the second and third linear solenoid valves 42 and 43 to the regulated low flow state (standby pressure state) (step S208), and the process flow shifts to step S211. In this case, since the setting for the linear solenoid valves 41 to 44 is ended in step S207 or S208, the AT-ECU 5 may not execute the subsequent process, and may end the linear solenoid valve standby setting process (steady, UP, DOWN).

If it is determined that the temperature TTC of the torque converter 3 is higher than the predetermined temperature in step S202, the AT-ECU 5 determines whether the vehicle speed Nv acquired from the vehicle speed sensor 204 by the vehicle speed acquiring unit 505 is lower (slower) than a predetermined vehicle speed (step S205). If it is determined that the vehicle speed Nv is the predetermined speed or higher, the process flow shifts to step S211.

In contrast, if it is determined that the vehicle speed Nv is lower than the predetermined vehicle speed, the AT-ECU 5 further determines whether the current state is the steady state at the first speed (step S206). If it is determined that the current state is the steady state at the first speed, the AT-ECU 5 sets the first to fourth linear solenoid valves 41 to 44 to the regulated low flow state (standby pressure state) (step S209). If it is determined that the current state is not the steady state at the first speed, that is, if the current state is the steady state at the second speed, the AT-ECU 5 sets the second and third linear solenoid valves 42 and 43 to the regulated low flow state (standby pressure state) (step S210), and the process flow shifts to step S211. In this case, since the setting for the linear solenoid valves 41 to 44 is ended in step S209 or S210, the AT-ECU 5 may not execute the subsequent process, and may end the linear solenoid valve standby setting process (steady, UP, DOWN).

Then, the AT-ECU 5 determines whether the current state is the steady state at one of the third, fourth, fifth, and sixth speeds (step S211). If it is determined that the current state is not the steady state at one of the third to sixth speeds, the process flow shifts to step S220. If it is determined that the current state is the steady state at one of the third to sixth speeds, the AT-ECU 5 determines whether the rotation speed Ne of the engine 1 acquired from the crankshaft rotation speed sensor 201 by the engine speed acquiring unit 503 is lower than a predetermined rotation speed (step S212). If it is determined that the rotation speed Ne of the engine 1 is the predetermined rotation speed or higher, the process flow shifts to step S220.

In contrast, if it is determined that the rotation speed Ne of the engine 1 is lower than the predetermined rotation speed, the AT-ECU 5 successively determines whether the current state is the steady state at the third speed (step S213), whether the current state is the steady state at the fourth speed (step S214), and whether the current state is the steady state at the fifth speed (step S215).

If it is determined that the current state is the steady state at the third speed, the AT-ECU 5 sets the first and third linear solenoid valves 41 and 43 to the regulated low flow state (standby pressure state) (or changes the applied current for the first and third linear solenoid valves 41 and 43 to 0.1 A (in the state at the position III in FIG. 4)) (step S216), and the process flow shifts to step S220. If it is determined that the current state is the steady state at the fourth speed, the AT-ECU 5 sets the first and second linear solenoid valves 41 and 42 to the regulated low flow state (standby pressure state) (step S217), and the process flow shifts to step S220. If it is determined that the current state is the steady state at the fifth speed, the AT-ECU 5 sets the second and third linear solenoid valves 42 and 43 to the regulated low flow state (standby pressure state) (step S218), and the process flow shifts to step S220. If it is determined that the current state is not the steady state at one of the third, fourth, and fifth speeds, the current state is the steady state at the sixth speed. The AT-ECU 5 sets the first and third linear solenoid valves 41 and 43 to the regulated low flow state (standby pressure state) (step S219), and the process flow shifts to step S220. In this case, since the setting for the linear solenoid valves 41 to 44 is ended in one of steps S216 to S219, the AT-ECU 5 may not execute the subsequent process, and may end the linear solenoid valve standby setting process (steady, UP, DOWN).

Then, the AT-ECU 5 determines whether the upshift is currently performed (step S220). If it is determined that the upshift is not currently performed, the process flow shifts to step S232. If it is determined that the upshift is currently performed, the AT-ECU 5 determines whether the rotation speed Ne of the engine 1 acquired from the crankshaft rotation speed sensor 201 by the engine speed acquiring unit 503 is lower than a predetermined rotation speed (step S221). If it is determined that the rotation speed Ne of the engine 1 is the predetermined rotation speed or higher, the process flow shifts to step S232.

In contrast, if it is determined that the rotation speed Ne of the engine 1 is lower than the predetermined rotation speed, the AT-ECU 5 successively determines whether the upshift is 1-2 upshift (from the first speed stage to the second speed stage, a similar expression is applied hereinafter) (step S222), whether the upshift is 2-3 upshift (step S223), whether the upshift is 3-4 upshift (step S224), whether the upshift is 4-5 upshift (step S225), and whether the upshift is 5-6 upshift (step S226), in accordance with the travel state of the vehicle.

If it is determined that the upshift is the 1-2 upshift, the AT-ECU 5 sets the second and third linear solenoid valves 42 and 43 to the regulated low flow state (standby pressure state) or changes the applied current for the second and third linear solenoid valves 42 and 43 to 0.1 A (in the state at the position III in FIG. 4)) (step S227), and the process flow shifts to step S232. If it is determined that the upshift is the 2-3 upshift, the AT-ECU 5 sets the third linear solenoid valve 43 to the regulated low flow state (standby pressure state) (step S228), and the process flow shifts to step S232. If it is determined that the upshift is the 3-4 upshift, the AT-ECU 5 sets the first linear solenoid valve 41 to the regulated low flow state (standby pressure state) (step S229), and the process flow shifts to step S232. If it is determined that the upshift is the 4-5 upshift, the AT-ECU 5 sets the second linear solenoid valve 42 to the regulated low flow state (standby pressure state) (step S230), and the process flow shifts to step S232. If it is determined that the upshift is the 5-6 upshift, the AT-ECU 5 sets the third linear solenoid valve 43 to the regulated low flow state (standby pressure state) (step S231), and the process flow shifts to step S232. If it is determined that the upshift is not one of the 1-2 upshift to the 5-6 upshift, the process flow shifts to step S232. In this case, since the setting for the linear solenoid valves 41 to 44 is ended in one of steps S227 to S231, the AT-ECU 5 may not execute the subsequent process, and may end the linear solenoid valve standby setting process (steady, UP, DOWN).

Finally, the AT-ECU 5 determines whether the downshift is currently performed (step S232). If it is determined that the downshift is not performed, the AT-ECU 5 ends the linear solenoid valve standby setting process (steady, UP, DOWN). If it is determined that the downshift is currently performed, the AT-ECU 5 determines whether the rotation speed Ne of the engine 1 acquired from the crankshaft rotation speed sensor 201 by the engine speed acquiring unit 503 is lower than a predetermined rotation speed (step S233). If it is determined that the rotation speed Ne of the engine 1 is the predetermined rotation speed or higher, the AT-ECU 5 ends the linear solenoid valve standby setting process (steady, UP, DOWN).

In contrast, if it is determined that the rotation speed Ne of the engine 1 is lower than the predetermined rotation speed, the AT-ECU 5 successively determines whether the downshift is 2-1 downshift (from the second speed stage to the first speed stage, a similar expression is applied hereinafter) (step S234), whether the downshift is 3-2 downshift (step S235), whether the downshift is 4-3 downshift (step S236), whether the downshift is 5-4 downshift (step S237), whether the downshift is 6-5 downshift (step S238), and whether the downshift is 3-1 downshift (step S239), in accordance with the travel state of the vehicle.

If it is determined that the downshift is the 2-1 downshift, the AT-ECU 5 sets the second and third linear solenoid valves 42 and 43 to the regulated low flow state (standby pressure state) (or changes the applied current for the second and third linear solenoid valves 42 and 43 to 0.1 A (in the state at the position III in FIG. 4)) (step S240), and ends the linear solenoid valve standby setting process (steady, UP, DOWN). If it is determined that the downshift is the 3-2 downshift, the AT-ECU 5 sets the third linear solenoid valve 43 to the regulated low flow state (standby pressure state) (step S241), and ends the linear solenoid valve standby setting process (steady, UP, DOWN). If it is determined that the downshift is the 4-3 downshift, the AT-ECU 5 sets the first linear solenoid valve 41 to the regulated low flow state (standby pressure state) (step S242), and ends the linear solenoid valve standby setting process (steady, UP, DOWN). If it is determined that the downshift is the 5-4 downshift, the AT-ECU 4 sets the second linear solenoid valve 42 to the regulated low flow state (standby pressure state) (step S243), and ends the linear solenoid valve standby setting process (steady, UP, DOWN). If it is determined that the downshift is the 6-5 downshift, the AT-ECU 5 sets the third linear solenoid valve 43 to the regulated low flow state (standby pressure state) (step S244), and ends the linear solenoid valve standby setting process (steady, UP, DOWN). If it is determined that the downshift is the 3-1 downshift, the AT-ECU 5 sets the third linear solenoid valve 43 to the regulated low flow state (standby pressure state) (step S245), and ends the linear solenoid valve standby setting process (steady, UP, DOWN). If it is determined that the downshift is not one of the 2-1 downshift to the 6-5 downshift, and the 3-1 downshift, the AT-ECU 5 ends the linear solenoid valve standby setting process (steady, UP, DOWN).

As described above, the hydraulic control apparatus 6 for the automatic transmission 2 include the hydraulic pump OP that is driven by the engine 1; the main regulator valve 64 that regulates the line pressure PL serving as the base pressure for actuating the plurality of clutches (the frictional engagement elements) 11 to 16 by using the fluid pressure supplied from the hydraulic pump OP; and the plurality of linear solenoid valves 41 to 44 each control the line pressure PL regulated by the main regulator valve 64, in accordance with the electromagnetic force of the solenoid. The first to fourth linear solenoid valves 41 to 44 include the spools 41$a$ to 44$a$. Each of the linear solenoid valves 41 to 44 is controlled under the normal hydraulic control mode or the current consumption decrease mode. Under the normal hydraulic control mode, the spool 41$a$, 42$a$, 43$a$, or 44$a$ is actuated in accordance with the electromagnetic force of the solenoid so that the spool 41$a$, 42$a$, 43$a$, or 44$a$ is at the balanced position, and hence the output fluid pressure is controlled to be the maximum output fluid pressure from the minimum output fluid pressure. Under the current consumption decrease mode, the current consumption for generating the electromagnetic force is decreased so that the fluid pressure is controlled to be equal to or lower than the minimum output fluid pressure under the normal hydraulic control mode and is held within the range corresponding to the balanced position of the spool 41$a$, 42$a$, 43$a$, or 44$a$. The AT-ECU 5 includes the control state acquiring device 501 that acquires the control state of the automatic transmission 2; and the linear solenoid mode changing device 501 that changes the mode between the normal hydraulic control mode and the current consumption decrease mode based on the control state of the automatic transmission 2 acquired by the control state acquiring device 506. With the hydraulic control apparatus 6 and the AT-ECU 5, the plurality of speed stages are established by selectively engaging and disengaging the clutches 11 to 16 by using fluid pressures supplied from the linear solenoid valves 41 to 44. With the hydraulic control apparatus for the automatic transmission, a (unused) linear solenoid valve that is included in the linear solenoid valves 41 to 44 and is not used in speed change control by the automatic transmission 2 is set to the current consumption decrease mode under a predetermined condition. Accordingly, current consumption of the linear solenoid valve can be minimized, the responsiveness of the linear solenoid valves 41 to 44 can be provided, and the control fluid pressure can be effectively prevented from being decreased during the speed change control by the automatic transmission 2.

In the hydraulic control apparatus for the automatic transmission, the control state acquiring device 501 may include the fluid temperature acquiring unit 502 that acquires the fluid temperature TATF of the automatic transmission fluid in the automatic transmission 2, and the engine speed acquiring unit 503 that acquires the rotation speed Ne of the engine 1. If the fluid temperature TATF of the automatic transmission fluid acquired by the fluid temperature acquiring unit 506 is the predetermined fluid temperature or higher, and if the rotation speed Ne of the engine 1 acquired by the engine speed acquiring unit 503 is the predetermined rotation speed or lower, the linear solenoid mode changing device 506 may change the unused linear solenoid valve included in the linear solenoid valves 41 to 44 to the current consumption decrease mode. If the rotation speed Ne of the engine 1 is in the low-speed region, the discharge flow of the hydraulic pump OP may be low. If the temperature of the automatic transmission fluid is high, the viscosity of the automatic transmission fluid may be low, and the fluid may flow out (leak). In such a case, the linear solenoid mode changing device 506 changes the current value to be supplied to the unused linear solenoid valve included in the linear solenoid valves 41 to 44 to the low-current value (in the embodiment, 0.1 A). Accordingly, the control fluid pressure can be prevented from being decreased by controlling the state of the unused linear solenoid valve included in the linear solenoid valves 41 to 44 to the regulated state (the regulated low flow state) in which the consumption flow at the unused linear solenoid valve included in the linear solenoid valves 41 to 44 is minimized.

In the hydraulic control apparatus for the automatic transmission, the control state acquiring device 501 may include the torque converter temperature estimating unit 504 that estimates the temperature TTC of the torque converter 3 based on the slip ratio ETR of the torque converter 3, the engine speed acquiring unit 503 that acquires the rotation speed Ne of the engine 1, and the vehicle speed acquiring unit 505 that acquires the vehicle speed Nv of the vehicle. If the automatic transmission 2 is in the steady state at the first speed stage or the second speed stage, if the temperature TTC of the torque converter 3 estimated by the torque converter temperature estimating unit 504 is the predetermined temperature or lower, if the rotation speed Ne of the engine 1 acquired by the engine speed acquiring unit 503 is the predetermined rotation speed or lower, and if the vehicle speed Nv of the vehicle acquired by the vehicle speed acquiring unit 505 is the predetermined vehicle speed or lower, the linear solenoid mode changing device 506 may change the unused linear solenoid valve included in the linear solenoid valves 41 to 44 to the current consumption decrease mode. If the estimated temperature TTC of the torque converter 3 is low, by satisfying the two conditions of the low rotation speed Ne of the engine 1 and the low vehicle speed Nv, the supply current (applied current) may be decreased to decrease the consumption flow at the unused linear solenoid valve included in the linear solenoid valves 41 to 44.

In the hydraulic control apparatus for the automatic transmission, if the automatic transmission 2 is in the steady state at the first speed stage or the second speed stage, if the temperature TTC of the torque converter 3 estimated by the torque converter temperature estimating unit 504 is higher than the predetermined temperature, and if the vehicle speed Nv of vehicle acquired by the vehicle speed acquiring unit 505 is the predetermined vehicle speed or lower, the linear solenoid mode changing device 506 may change the unused linear solenoid valve included in the linear solenoid valves 41 to 44 to the current consumption decrease mode. If the estimated temperature TTC of the torque converter 3 is high, the condition for the rotation speed Ne of the engine may be eliminated, and the supply current to the unused linear solenoid valve included in the linear solenoid valves 41 to 44 may be decreased by using only the condition for the vehicle speed Nv.

In the hydraulic control apparatus for the automatic transmission, if the automatic transmission 2 is in the steady state at any of the third to sixth speed stages, or if the automatic transmission 2 performs the upshift or the downshift from the current speed stage to the target speed stage, and if the rotation speed Ne of the engine 1 acquired by the engine speed acquiring unit 503 is the predetermined speed or lower, the linear solenoid mode changing device 506 may change the unused linear solenoid valve included in the linear solenoid valves 41 to 44 to the current consumption decrease mode. If the rotation speed Ne of the engine 1 is low when the automatic transmission 2 performs the upshift or the downshift, and if the discharge flow of the hydraulic pump OP is low accordingly, by changing the unused linear solenoid valve included in the linear solenoid valves 41 to 44 to the current consumption decrease mode, the automatic transmission fluid can be effectively prevented from leaking from the unused linear solenoid valve included in the linear solenoid valves 41 to 44, and hence the control fluid pressure can be prevented from being decreased.

In the hydraulic control apparatus for the automatic transmission, if the rotation speed Ne of the engine 1 acquired by the engine speed acquiring unit 503 is the predetermined speed or lower, and if the automatic transmission 2 is in the in-gear state with any of the speed stages, the linear solenoid mode changing device 506 may change the unused linear solenoid valve included in the linear solenoid valves 41 to 44 to the current consumption decrease mode. If the rotation speed Ne of the engine 1 is low when the automatic transmission 2 performs the in-gear control to any of the speed stages, and if the discharge flow of the hydraulic pump OP is low accordingly, by changing the unused linear solenoid valve included in the linear solenoid valves 41 to 44 to the current consumption decrease mode, the automatic transmission fluid can be effectively prevented from leaking from the unused linear solenoid valve included in the linear solenoid valves 41 to 44, and hence the control fluid pressure can be prevented from being decreased.

The hydraulic control apparatus for the automatic transmission according to the embodiment of the invention has been described above in detail with reference to the attached drawings. However, the invention is not limited thereto, and may be modified in various forms within the technical scope of the invention described in the claims, the specification, and the drawings. Even when a configuration has a shape, a structure, and a function that are not directly described in the specification or the drawings, such a configuration may be included within the technical scope of the invention as long as the configuration has an advantage and an effect similar to those of the invention. In particular, the portions that define the hydraulic control apparatus (hydraulic control circuit) 6 and the AT-ECU 5 (and the FI-ECU 4) for the automatic transmission may be replaced with desirable configurations that can provide similar functions. Also, desirable structures may be added to the invention.

With the hydraulic control apparatus for the automatic transmission according to the embodiment of the present invention, a (unused) linear solenoid valve that is not used in speed change control by the automatic transmission is set to the current consumption decrease mode under a predetermined condition (in the aspect of the invention, a control state of the automatic transmission acquired by the control state acquiring device). Accordingly, current consumption of the linear solenoid valve can be minimized, responsiveness of the linear solenoid valve can be provided, and the control fluid pressure can be effectively prevented from being decreased during the speed change control by the automatic transmission.

In the hydraulic control apparatus for the automatic transmission according to the embodiment of the present invention, the control state acquiring device (501) may include a fluid temperature acquiring unit (502) that acquires a fluid temperature (TATF) of automatic transmission fluid in the automatic transmission (2), and an engine speed acquiring unit (503) that acquires a rotation speed (Ne) of the engine (1). If the fluid temperature (TATF) of the automatic transmission fluid acquired by the fluid temperature acquiring unit (502) is a predetermined fluid temperature or higher, and if the rotation speed (Ne) of the engine (1) acquired by the engine speed acquiring unit (503) is a predetermined rotation speed or lower, the linear solenoid mode changing device (506) may change an unused linear solenoid valve included in the linear solenoid valves (41 to 44) to the current consumption decrease mode. If the rotation speed of the engine is in a low-speed region, the discharge flow of the hydraulic pump may be low. If the temperature of the automatic transmission fluid is high, the viscosity of the automatic transmission fluid may be low, and the fluid may flow out (leak). In such a case, the linear solenoid mode changing device changes the current value to be supplied to the unused linear solenoid valve to the low-current value. Accordingly, the control fluid pressure can be prevented from being decreased by controlling the state of the unused linear solenoid valve to the regulated state (the regulated low flow state) in which the consumption flow at the unused linear solenoid valve is minimized.

In the hydraulic control apparatus for the automatic transmission according to the embodiment of the present invention, the control state acquiring device (501) may include a torque converter temperature estimating unit (504) that estimates a temperature (TTC) of the torque converter (3) based on a slip ratio (ETR) of the torque converter (3), an engine speed acquiring unit (503) that acquires a rotation speed (Ne) of the engine (1), and a vehicle speed acquiring unit (505) that acquires a vehicle speed (Nv) of a vehicle. If the automatic transmission (2) is in a steady state at a first speed stage or a second speed stage, if the temperature (TTC) of the torque converter (3) estimated by the torque converter temperature estimating unit (504) is a predetermined temperature or lower, if the rotation speed (Ne) of the engine (1) acquired by the engine speed acquiring unit (503) is a predetermined rotation speed or lower, and if the vehicle speed (Nv) of the vehicle acquired by the vehicle speed acquiring unit (505) is a predetermined vehicle speed or lower, the linear solenoid mode changing device (506) may change an unused linear solenoid valve included in the linear solenoid valves (41 to 44) to the current consumption decrease mode. If the estimated temperature of the torque converter is low, by satisfying the two conditions of the low rotation speed of the engine and the low vehicle speed, the supply current (applied current) may be decreased to decrease the consumption flow at the unused linear solenoid valve.

In the hydraulic control apparatus for the automatic transmission according to the embodiment of the present invention, if the automatic transmission (2) is in the steady state at the first speed stage or the second speed stage, if the temperature (TTC) of the torque converter (3) estimated by the torque converter temperature estimating unit (504) is higher than the predetermined temperature, and if the vehicle speed (Nv) of vehicle acquired by the vehicle speed acquiring unit (505) is the predetermined vehicle speed or lower, the linear solenoid mode changing device (506) may change the unused linear solenoid valve included in the linear solenoid valves (41 to 44) to the current consumption decrease mode. If the estimated temperature of the torque converter is high, the condition for the rotation speed of the engine may be eliminated, and the supply current to the unused linear solenoid valve may be decreased by using only the condition for the vehicle speed.

In the hydraulic control apparatus for the automatic transmission according to the embodiment of the present invention, if the automatic transmission (2) is in a steady state at any of third to sixth speed stages, or if the automatic transmission (2) performs upshift or downshift from a current speed stage to a target speed stage, and if the rotation speed (Ne) of the engine (1) acquired by the engine speed acquiring unit (503) is the predetermined speed or lower, the linear solenoid mode changing device (506) may change the unused linear solenoid valve included in the linear solenoid valves (41 to 44) to the current consumption decrease mode. If the rotation speed of the engine is low when the automatic transmission performs the upshift or the downshift, and if the discharge flow of the hydraulic pump is low accordingly, by changing the unused linear solenoid valve to the current consumption decrease mode, the automatic transmission fluid can be effectively prevented from leaking from the unused linear solenoid valve, and hence the control fluid pressure can be prevented from being decreased.

In the hydraulic control apparatus for the automatic transmission according to the embodiment of the present invention, if the rotation speed (Ne) of the engine (1) acquired by the engine speed acquiring unit (503) is the predetermined speed or lower, and if the automatic transmission (2) is in an in-gear state with any of the speed stages, the linear solenoid mode changing device (506) may change the unused linear solenoid valve included in the linear solenoid valves (41 to 44) to the current consumption decrease mode. If the rotation speed of the engine is low when the automatic transmission performs in-gear control to any of the speed stages, and if the discharge flow of the hydraulic pump is low accordingly, by changing the unused linear solenoid valve to the current consumption decrease mode, the automatic transmission fluid can be effectively prevented from leaking from the unused linear solenoid valve, and hence the control fluid pressure can be prevented from being decreased.

With the embodiment of the invention, if the control of the automatic transmission is in the predetermined control state, that is, in the control state in which the control fluid pressure should be prevented from being decreased, by setting the linear solenoid valve to the regulated state in which the consumption flow thereof is minimized, the control fluid can be prevented from being decreased while the responsiveness of the linear solenoid valve during use (at the start of use) can be properly provided.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic control apparatus for an automatic transmission, the apparatus comprising:
   a hydraulic pump that is driven by an engine;
   a regulator valve configured to regulate a line pressure serving as a base pressure for actuating a plurality of frictional engagement elements by using a fluid pressure supplied from the hydraulic pump;
   a plurality of linear solenoid valves each configured to control the line pressure regulated by the regulator valve in accordance with an electromagnetic force of a solenoid, each of the linear solenoid valves comprising a spool and being controlled under a normal hydraulic control mode and a current consumption decrease mode, the spool being actuated in accordance with the electromagnetic force of the solenoid, an output fluid pressure being controlled to be a maximum output fluid pressure from a minimum output fluid pressure with the spool which is at a balanced position under the normal hydraulic control mode, a current consumption for generating the electromagnetic force being decreased under the current consumption decrease mode so that the fluid pressure is controlled to be equal to or lower than the minimum output fluid pressure under the normal hydraulic control mode and the fluid pressure is held within a range corresponding to the balanced position of the spool, the frictional engagement elements being selectively engaged and disengaged by using fluid pressures supplied from the linear solenoid valves to establish a plurality of speed stages;
   a control state acquiring device configured to acquire a control state of the automatic transmission; and
   a linear solenoid mode changing device configured to change an operating mode of the linear solenoid valves between the normal hydraulic control mode and the current consumption decrease mode based on the control state of the automatic transmission acquired by the control state acquiring device.

2. The hydraulic control apparatus for the automatic transmission according to claim 1,
   wherein the control state acquiring device comprises
      a fluid temperature acquiring unit configured to acquire a fluid temperature of automatic transmission fluid in the automatic transmission, and
      an engine speed acquiring unit configured to acquire a rotation speed of the engine,
   wherein, if the fluid temperature of the automatic transmission fluid acquired by the fluid temperature acquiring unit is a predetermined fluid temperature or higher, and if the rotation speed of the engine acquired by the engine speed acquiring unit is a predetermined rotation speed or lower, the linear solenoid mode changing device is configured to change an unused linear solenoid valve included in the linear solenoid valves to the current consumption decrease mode.

3. The hydraulic control apparatus for the automatic transmission according to claim 1,
   wherein the control state acquiring device comprises
      a torque converter temperature estimating unit configured to estimate a temperature of the torque converter based on a slip ratio of the torque converter, an engine speed acquiring unit configured to acquire a rotation speed of the engine, and a vehicle speed acquiring unit configured to acquire a vehicle speed of a vehicle; and wherein, if the automatic transmission is in a steady state at a first speed stage or a second speed stage, if the temperature of the torque converter estimated by the torque converter temperature estimating unit is a predetermined temperature or lower, if the rotation speed of the engine acquired by the engine speed acquiring unit is a predetermined rotation speed or lower, and if the vehicle speed of the vehicle acquired by the vehicle speed acquiring unit is a predetermined vehicle speed or lower, the linear solenoid mode changing device is configured to change an unused linear solenoid valve included in the linear solenoid valves to the current consumption decrease mode.

4. The hydraulic control apparatus for the automatic transmission according to claim 3, wherein, if the automatic transmission is in the steady state at the first speed stage or the second speed stage, if the temperature of the torque converter estimated by the torque converter temperature estimating unit is higher than the predetermined temperature, and if the vehicle speed of vehicle acquired by the vehicle speed acquiring unit is the predetermined vehicle speed or lower, the linear solenoid mode changing device is configured to change the unused linear solenoid valve included in the linear solenoid valves to the current consumption decrease mode.

5. The hydraulic control apparatus for the automatic transmission according to claim 2, wherein, if the automatic transmission is in a steady state at any of third to sixth speed stages, or if the automatic transmission performs upshift or downshift from a current speed stage to a target speed stage, and if the rotation speed of the engine acquired by the engine speed acquiring unit is the predetermined speed or lower, the linear solenoid mode changing device is configured to change the unused linear solenoid valve included in the linear solenoid valves to the current consumption decrease mode.

6. The hydraulic control apparatus for the automatic transmission according to claim 2, wherein, if the rotation speed of the engine acquired by the engine speed acquiring unit is the predetermined speed or lower, and if the automatic transmission is in an in-gear state with any of the speed stages, the linear solenoid mode changing device is configured to change the unused linear solenoid valve included in the linear solenoid valves to the current consumption decrease mode.

7. The hydraulic control apparatus for the automatic transmission according to claim 3, wherein, if the automatic transmission is in a steady state at any of third to sixth speed stages, or if the automatic transmission performs upshift or downshift from a current speed stage to a target speed stage, and if the rotation speed of the engine acquired by the engine speed acquiring unit is the predetermined speed or lower, the linear solenoid mode changing device is configured to change the unused linear solenoid valve included in the linear solenoid valves to the current consumption decrease mode.

8. The hydraulic control apparatus for the automatic transmission according to claim 4, wherein, if the automatic transmission is in a steady state at any of third to sixth speed stages, or if the automatic transmission performs upshift or downshift from a current speed stage to a target speed stage, and if the rotation speed of the engine acquired by the engine speed acquiring unit is the predetermined speed or lower, the linear solenoid mode changing device is configured to change the unused linear solenoid valve included in the linear solenoid valves to the current consumption decrease mode.

9. The hydraulic control apparatus for the automatic transmission according to claim 3, wherein, if the rotation speed of the engine acquired by the engine speed acquiring unit is the predetermined speed or lower, and if the automatic transmission is in an in-gear state with any of the speed stages, the linear solenoid mode changing device is configured to change the unused linear solenoid valve included in the linear solenoid valves to the current consumption decrease mode.

10. The hydraulic control apparatus for the automatic transmission according to claim 4, wherein, if the rotation speed of the engine acquired by the engine speed acquiring unit is the predetermined speed or lower, and if the automatic transmission is in an in-gear state with any of the speed stages, the linear solenoid mode changing device is configured to change the unused linear solenoid valve included in the linear solenoid valves to the current consumption decrease mode.

11. The hydraulic control apparatus for the automatic transmission according to claim 5, wherein, if the rotation speed of the engine acquired by the engine speed acquiring unit is the predetermined speed or lower, and if the automatic transmission is in an in-gear state with any of the speed stages, the linear solenoid mode changing device is configured to change the unused linear solenoid valve included in the linear solenoid valves to the current consumption decrease mode.

12. A hydraulic control apparatus for an automatic transmission, the apparatus comprising:

a hydraulic pump that is driven by an engine;

regulator means for regulating a line pressure serving as a base pressure for actuating a plurality of frictional engagement elements by using a fluid pressure supplied from the hydraulic pump;

a plurality of linear solenoid valves each configured to control the line pressure regulated by the regulator means in accordance with an electromagnetic force of a solenoid, each of the linear solenoid valves comprising a spool and being controlled under a normal hydraulic control mode and a current consumption decrease mode, the spool being actuated in accordance with the electromagnetic force of the solenoid, an output fluid pressure being controlled to be a maximum output fluid pressure from a minimum output fluid pressure with the spool which is at a balanced position under the normal hydraulic control mode, a current consumption for generating the electromagnetic force being decreased under the current consumption decrease mode so that the fluid pressure is controlled to be equal to or lower than the minimum output fluid pressure under the normal hydraulic control mode and the fluid pressure is held within a range corresponding to the balanced position of the spool, the frictional engagement elements being selectively engaged and disengaged by using fluid pressures supplied from the linear solenoid valves to establish a plurality of speed stages;

control state acquiring means for acquiring a control state of the automatic transmission; and linear solenoid mode changing means for changing an operating mode of the linear solenoid valves between the normal hydraulic control mode and the current consumption decrease mode based on the control state of the automatic transmission acquired by the control state acquiring means.

\* \* \* \* \*